US007488148B2

(12) United States Patent
Byrne

(10) Patent No.: US 7,488,148 B2

(45) Date of Patent: Feb. 10, 2009

(54) INCREMENTAL MATERIAL URGING SYSTEM

(75) Inventor: Laurence Michael Byrne, Wagga Wagga (AU)

(73) Assignee: Alexandria Nominees Pty Ltd, Wagga Wagga (AU)

(*) Notice: Subject to any disclaimer, the term of this patent is extended or adjusted under 35 U.S.C. 154(b) by 0 days.

(21) Appl. No.: 11/418,936

(22) Filed: May 4, 2006

(65) Prior Publication Data

US 2007/0012202 A1 Jan. 18, 2007

Related U.S. Application Data

(63) Continuation-in-part of application No. 10/508,747, filed as application No. PCT/AU03/00349 on Mar. 21, 2003, now Pat. No. 7,419,348.

(30) Foreign Application Priority Data

Mar. 21, 2002 (AU) ..................................... PS1251

(51) Int. Cl.
*B60P 1/00* (2006.01)

(52) U.S. Cl. ..................... 414/525.2; 414/517; 414/813

(58) Field of Classification Search ................. 414/395, 414/400, 511, 513, 517, 525.1, 525.2, 525.6, 414/525.9, 813; 100/299 R, 270
See application file for complete search history.

(56) References Cited

U.S. PATENT DOCUMENTS 3,422,973 A 1/1969 Longman
3,561,624 A * 2/1971 Thurmond et al. .......... 414/304
3,759,406 A 9/1973 Nickel
3,799,374 A 3/1974 Weaver
3,881,613 A 5/1975 Torimoto et al.
4,111,485 A 9/1978 Martin et al.
4,145,824 A 3/1979 Watson
4,359,307 A 11/1982 Johnson, Jr.
4,371,306 A 2/1983 Smith
4,576,540 A 3/1986 Derain et al.
4,627,783 A 12/1986 DeFilippi
4,729,304 A * 3/1988 Gardella et al. ............. 100/218
4,877,366 A 10/1989 DeFilippi
4,923,356 A 5/1990 Foster
4,941,796 A 7/1990 DeFilippi
5,238,359 A 8/1993 Chen
5,314,290 A 5/1994 Lutz et al.
5,527,147 A * 6/1996 Hulls ......................... 414/809
6,138,557 A * 10/2000 Brown et al. .................. 100/41

(Continued)

FOREIGN PATENT DOCUMENTS

AU B 86966/75 12/1975

(Continued)

*Primary Examiner*—James Keenan
(74) *Attorney, Agent, or Firm*—Knobbe, Martens, Olson & Bear LLP

(57) ABSTRACT

An incremental material urging system adapted to the compaction of a volume of compactable material including a container structure with floor, roof, and opposing side wall structures closed at a rearward end. The roof has a loading aperture for introducing the compactable material into the container structure. The system also includes an incrementing urging structure adapted to traversing substantially the length of the container structure. A discharge gate is provided at a discharge end of the container structure for the ejection of the compactable material. Two cooperating mechanical systems urge the incrementing urging structure into incremental horizontal motion within the container structure.

18 Claims, 24 Drawing Sheets

U.S. PATENT DOCUMENTS

| | | | | |
|---|---|---|---|---|
| 6,234,739 | B1 | 5/2001 | Smith et al. | |
| 6,497,547 | B1 | 12/2002 | Maglaras | |
| 6,632,066 | B1 | 10/2003 | Kojima | |
| 7,419,348 | B2 * | 9/2008 | Byrne | 414/525.2 |
| 2005/0191158 | A1 | 9/2005 | Byrne | |
| 2007/0012202 | A1 | 1/2007 | Bryne et al. | |

FOREIGN PATENT DOCUMENTS

| | | |
|---|---|---|
| AU | B 10559/76 | 1/1976 |
| AU | A-27213/95 | 2/1996 |
| EP | 0 562 312 B1 | 5/1997 |

* cited by examiner

INCREMENTAL MATERIAL URGING SYSTEM

RELATED APPLICATIONS

This application is a continuation-in-part of U.S. patent application Ser. No. 10/508,747, filed Mar. 4, 2005, now U.S. Pat. No. 7,419,348 which is a National Stage Application of PCT/AU03/00349, filed Mar. 21, 2003, which claims the benefit of priority from Australian application No. PS1251, filed Mar. 21, 2002, all of which are hereby incorporated herein in their entirety.

The present invention relates to systems for the incremental conveying of solid material for transfer between adjacent locations and for the incremental compaction of loose polymorphous material for the purposes of minimizing costs of storage, transportation or disposal.

BACKGROUND

Compaction of loose material is desirable in many industries and for many different reasons. Generally the process includes some form of a confining volume into which the material is deposited with a subsequent mechanical means of decreasing that volume.

In a particular application, that of waste management, the confining volume may take the form of an elongate generally rectangular section container having a moveable urging structure at one end. Waste matter is introduced into the container following which hydraulic rams cause the urging structure to be moved along a part of the length of the container, driving the material into a compacted mass against a discharge gate. Once compacted, the mass may be ejected from the forward end of the container structure by a further movement of the rams, for example into a transport vehicle.

A feature of such compaction systems is the need for very long hydraulic rams. These then have to be of telescopic multi stage construction and of large diameter to ensure sufficient power towards the end of the compaction stroke, where the load tends to a maximum. These requirements in turn demand very large hydraulic power systems making compactors of this type very expensive and generally beyond the reach of small isolated communities.

Generally the discharge of the compacted material is into a transport vehicle for subsequent transfer to a waste disposal or recycling site at which point the material has to be removed from the transport vehicle.

One known method is that of hydraulically jacking the container portion of the vehicle to a sufficient angle to allow the material to be ejected under the force of gravity. Particularly at soft surface land-fill sites this entails a danger of the vehicle tipping over side-ways as its center of gravity is raised during the jacking process.

Another known method is by means of a so-called walking floor fitted to the vehicle in which a series of hydraulically articulated rails cover the floor of the vehicle. These are bulky, very complex, expensive and heavy devices with high wear rates and maintenance costs, adding significantly to the cost of waste management.

In general the conveying of solid material or objects into and out of a transport vehicle is generally a time consuming operation often involving piecemeal retrieval of one object at a time from its pre-loading position to a position in the transport vehicle. Particularly in the case of palletized materials, the usual method is by means of a fork-truck or similar equipment. This imposes limitations on the type of vehicle which can be used, generally requiring a vehicle with side-loading capability. This requires considerable adjacent space, which may be a scarce and expensive commodity at city loading docks for example.

It is an object of the present invention to address or ameliorate at least one of the above disadvantages.

BRIEF DESCRIPTION OF INVENTION

Accordingly in one broad form of the invention there is provided an incremental material urging system adapted to the compaction of a volume of compactable material; said system comprising:

(a) a container structure including floor, roof, and side wall structures closed at a first rearward end, (b) a loading aperture in said roof for introducing said compactable material into said container structure, (c) an incrementing urging structure adapted to traversing substantially the length of said container structure, (d) a discharge gate at a second forward end of said container structure for the ejection of said compactable material, characterized in that said incrementing urging structure is urged into incremental horizontal motion within said container structure by two cooperating mechanical systems.

Preferably a first one of said two cooperating mechanical systems is an urging structure driving mechanism.

Preferably a second one of said two cooperating mechanical systems is an incrementing urging structure engagement mechanism disposed within said incrementing urging structure.

Preferably said incrementing urging structure is comprised of a box-like structure having at least a material urging front compacting face substantially equal in area and dimensions as the internal cross section of said container structure; said urging structure further including side elements and top and bottom elements adapted to permit sliding movement of said urging structure within said container structure.

Preferably each of said side wall structures is provided with an elongate slot extending substantially the length of said container structure; said slot communicating with the inside surface of each of said side wall structures.

Preferably said incrementing urging structure engagement mechanism includes a pair of thrust tongue plates each disposed at one of said side elements of said urging structure and urged by actuator means so as to alternate between a first inwardly retracted state and a second outwardly projecting state; the arrangement being such as to cause each of said thrust tongue plates to project outwardly through a respective said elongate slot.

Preferably said engagement mechanism further includes a pair of retainer tongue plates; each of said retainer tongue plates disposed at respective said side elements of said incrementing urging structure and urged by actuator means to alternate between a first inwardly retracted state and a second outwardly projecting state; the arrangement being such as to cause each of said retainer tongue plates to engage with respective ones of a pair of opposing retainer slots; said pair being one pair of a plurality of pairs of retainer slots arranged along said sidewall structures of said container structure.

Preferably said incrementing urging structure driving mechanism includes a pair of elongate members disposed along respective outsides of said sidewall structures; said elongate members urged into reciprocal horizontal motion by incrementing urging structure driving mechanism hydraulic rams.

Preferably said pair of elongate members are linked rigidly together at rearmost ends of said elongate members by a cross member.

Preferably each said elongate member is provided with a plurality of equi-spaced engagement nests; each said nest including an elongate slot; each said elongate slot of each of said engagement nests horizontally aligned with said elongate slot in said sidewall structure.

Preferably successive opposing pairs of said elongate slots of said engagement nests are adapted to receive inserted therein a respective said thrust tongue plate when said thrust tongue plates are urged into said outwardly projecting state.

Preferably spacing between said engagement nests is substantially equal to the stroke of said incrementing urging structure driving mechanism hydraulic rams. Preferably spacing between said plurality of retainer slots is equal to said spacing between said engagement nests.

Preferably said system is further provided with a retracting mechanism; said retracting mechanism adapted to retract said incrementing urging structure from an advanced position within said container structure to a rearward position.

Preferably said retracting mechanism comprises a winch located at a rearward end of said container structure; a cable or chain from said winch attached to said urging structure; said retracting mechanism including sensing means adapted to monitor position of said incrementing urging structure within said containing structure.

Preferably said container structure is provided with load cells disposed at each corner support of said container structure; signal outputs of said load cells processed by a computer linked to said load cells; said computer adapted to monitor weight and weight distribution of a volume of compacted refuse in said container structure.

In a further broad form of the invention there is provided a method for forward incremental urging of the incrementing urging structure described above along the length of said container structure; said method including the steps of:

(a) in-stroking said incrementing hydraulic means of said driving mechanism, (b) urging said thrust tongue plates into said second outwardly projecting state so as to engage with one of said plurality of engagement nests, (c) out-stroking said incrementing hydraulic means so as to urge said elongate member, said plurality of engagement nests and said urging structure one increment towards said forward end of said container structure, (d) urging said retainer tongue plates into said second outwardly projecting state so as to engage with respective ones of said plurality of said retainer slots along each of said sidewall structures, (e) urging said thrust tongue plates into said first inwardly retracted state, (f) in-stroking said incrementing hydraulic means, (g) iterating steps (a) to (f) until said urging structure reaches a maximum forwardly incremented position.

In a further broad form of the invention there is provided a method for the compaction and transfer to a refuse transport means of a volume of refuse, said method including the steps of:—

(a) loading a quantity of refuse material through an opening in the roof of a container structure, said container structure provided with an incrementing material urging structure and an openable discharge gate, (b) closing said opening so as to provide a sealed container envelope for said quantity of refuse, (c) incrementally advancing said urging structure to a desired degree of compaction of said refuse material, (d) aligning the loading aperture of a refuse transport means with said discharge gate of said container structure, (e) opening of said discharge gate and incrementing said material urging structure so as to discharge said refuse material into said refuse transport means.

Preferably each increment of said material urging structure from said fully retracted position towards said fully advanced position moves material towards said discharge end.

Accordingly there is provided in a further broad form of the invention an incremental material urging system comprising:

(a) a container structure having a rear end and a forward end, (b) a material urging structure (c) material urging structure activating means wherein said material urging structure is incrementally advanced from a retracted position at said rear end of said container structure, to a fully advanced position at said forward end of said container structure, where said forward end is a discharge end.

Preferably said container structure includes;

(a) a floor sub-structure (b) side wall sub-structures (c) a roof (d) a top opening (e) a top opening cover (f) a discharge end closure means Preferably said material urging structure is incrementally retracted by said activating means from said discharge end to said rear end of said container structure, Preferably said activating means are disposed along each side wall of said container structure and wherein said activating means operate substantially in unison.

Preferably said material urging structure is a close sliding fit within said container structure, said material urging structure adapted to slide on the surface of said floor sub-structure.

Preferably each of said side wall substructures is provided with a slot extending substantially along the length of said wall substructure, said slot providing a separation between an upper and a lower portion of internal wall sheeting.

Preferably said material urging structure is provided on each side of said structure with a projecting lug, each one of said lugs projecting through one of said slots.

Preferably each of said slots is co-linear with a rail system said rail system adapted to support and guide a reciprocating beam.

Preferably said reciprocating beam is provided with a plurality of thrust assemblies, said thrust assemblies disposed at substantially equal intervals along the length of said beam, between a forward end and a rear end of said beam.

Preferably each of said thrust assemblies includes;

(a) an assembly support (b) a double ended pawl (c) a pawl pivot shaft (d) a pawl actuator means Preferably said double ended pawl is rotatable about said pawl pivot shaft by said pawl actuator means from a first forward thrusting position to a second rearward thrusting position.

Preferably said pawl actuator means is a linear actuator.

Preferably each of said double ended pawls is rotated by a linear actuator; said actuator pivotally connected at a first end to one end of said double ended pawls and at a second end to said reciprocating beam.

Preferably each of said double ended pawl is provided with a pawl control bracket, said bracket supporting a control pivot shaft.

Preferably each said control pivot shaft is pivotally connected to a common control arm, said control arm being pivotally connected at an outer end to a linear actuator and wherein said actuator is pivotally connected to said reciprocating beam.

Preferably each said double ended pawl is adapted to thrust against the rearward facing side of said projecting lug when said double ended pawl is in said forward thrusting position and to thrust against the forward facing side of said projecting lug when said double ended pawl is in a rearward thrusting position.

Preferably that portion of a first end of said double ended pawl adapted to thrust against said projecting lug presents a vertical outer surface when set in said forward thrusting position or said rearward thrusting position; a second end of said double ended pawl then rotated to a position precluding potential contact with said projecting lug.

Preferably each opposite face of each of said first end and said second end of said double ended pawl is a sloping face, each said sloping face intersecting on the bisector of said double ended pawl so as to form a shallow "V" shaped space and where said sloping opposite face of that end set to a thrusting position is adapted to impart a turning moment to said pawls when impacting on said projecting lug while said pawl actuator means is deactivated.

Preferably each said double ended pawl may be rotated when impacted by a said sloping face to a position about said pivot shaft such that said projecting lug is able to pass said thrust assembly.

Preferably said reciprocating beam is urged into reciprocating motion by an hydraulic ram pivotally connected at a first end of said ram to said reciprocating beam and at a second end of said ram to said container structure.

Preferably said reciprocating beam is fitted at its forward outer end with an initial retraction thrust block and at its rear outer end with an initial advance thrust block.

Preferably, when said material urging structure is in a fully retracted first position at said rear end of said container structure and said hydraulic ram is retracted, said projecting lug is located between said initial advance thrust block and the first thrust assembly located nearest said rear end of said reciprocating beam.

Preferably said reciprocating motion for a first forward movement of said material urging structure comprises the steps of:

(a) extending said hydraulic ram to urge said initial advance thrust block into contact with said projecting lug so as to drive said lug and said material urging structure to a first partial forward incremented position,
(b) retracting said pawl actuator means to rotate said double ended pawl into a forward thrust position,
(c) deactivating said pawl actuator means so as to allow rotation of said double ended pawls when the sloping face of that pawl set to said forward thrust position is contacted by said projecting lug,
(d) retracting said hydraulic ram so as to retract said thrust assembly nearest to rear end of said reciprocating beam past said projecting lug,
(e) retracting said pawl actuator means to reset said double ended pawls of said thrust assembly nearest to rear end of said reciprocating beam to said forward thrust position,
(f) extending said hydraulic ram to drive said thrust assembly nearest to rear end of said reciprocating beam into contact with said projecting lug thereby driving said material urging structure to a completed first forward increment.

Preferably subsequent forward increments of said material urging structure comprise the steps of:

(a) deactivating said pawl actuator means so as to allow rotation of said double ended pawl when contacted by said projecting lug,
(b) retracting said hydraulic ram so as to retract the next forward thrust assembly past said projecting lug,
(c) retracting said pawl actuator means to reset the next forward thrust assembly to said forward thrust position,
(d) extending said hydraulic ram to drive forward said next forward thrust assembly thereby driving said material urging structure to a next forward incremented position.

Preferably, when said material urging structure is in a fully advanced position at said forward end of said container structure and said hydraulic ram is extended, said projecting lug is located between said initial retract thrust block and the thrust assembly located nearest said forward end of said reciprocating beam.

Preferably a sequence for a first rearward movement of said material urging structure comprises the steps of:

(a) retracting said hydraulic ram to urge said initial retract thrust block into contact with said projecting lug thereby driving said lug and said material urging structure to a first partial rearward incremented position,
(b) extending said pawl actuator means to rotate said double ended pawl into a rearward thrust position,
(c) deactivating said pawl actuator means so as to allow rotation of said double ended pawls when the sloping face of that pawl set to said rearward thrust position is contacted by said projecting lug,
(d) extending said hydraulic ram so as to advance said thrust assembly nearest to forward end of said reciprocating beam past said projecting lug,
(e) extending said pawl control actuator to reset said double ended pawls of said thrust assembly nearest to rear end of said reciprocating beam to said rearward thrust position, Preferably subsequent rearward increments of said material urging structure comprise the steps of:

(a) deactivating said pawl actuator means so as to allow rotation of said double ended pawls when contacted by said projecting lug,
(b) extending said hydraulic ram so as to advance the next rearward thrust assembly past said projecting lug,
(c) extending said pawl actuator means to reset the next rearward thrust assembly to said rearward thrust position,
(d) retracting said hydraulic ram to drive rearward said next rearward thrust assembly thereby driving said material urging structure to a next rearward incremented position.

Preferably said urging system is adapted to the compaction of refuse.

Preferably said roof is provided with an openable aperture for the introduction of refuse into said container structure.

Preferably said discharge end closure means is in the form of a discharge gate, said gate adapted to provide a reaction surface for the compaction of said refuse between said discharge gate and said material urging structure.

Preferably said container structure is provided with an intermediate openable gate positioned between said discharge gate and said openable aperture in said roof, said intermediate gate adapted to provide a reaction surface for the compaction of refuse between said intermediate gate and said material urging structure.

Preferably said container structure is provided with a plurality of articulated compaction devices; said devices supported by hinges along said sides of said container structure; said devices acting through apertures in said sides to intrude into a volume of refuse contained in said container structure.

Preferably said articulated compaction devices are hinged from said roof of said container structure; said compaction devices acting through apertures in said roof.

Preferably said container structure is provided with at least one articulated section of said floor substructure; said section adapted to rise vertically within said container structure to provide compaction force on a volume of refuse.

Preferably said container structure is provided with at least one articulated section of said roof; said section adapted to descend vertically within said container structure to provide compaction force on a volume of refuse.

Preferably said material urging system is adapted to the transfer of a compacted volume of refuse from said container structure into a transport vehicle.

Preferably said system is adapted to the retrofitting of said system to existing refuse transfer stations.

Preferably said system is adapted to the reduction in volume of any compactable material.

Preferably said system is adapted to the discharge of material from a transport vehicle, the load container of said vehicle forming a container structure.

In a further preferred embodiment of the invention said material urging structure activating means includes a primary mechanical system and a secondary mechanical system.

Preferably said primary mechanical system includes a pair of hydraulic rams; each hydraulic ram of said pair of hydraulic rams affixed to a rearward end of one of said side wall substructures.

Preferably said piston rod of each hydraulic ram of said pair of hydraulic rams is connected to a respective engagement nest beam.

Preferably each said respective engagement nest beam extends substantially the length of said container structure.

Preferably each said engagement nest beam is adapted to simultaneous guided reciprocal motion by in-stroke and out-stroke action of said hydraulic ram.

Preferably each nest of said engagement nest beam is provided with an elongate slot.

Preferably each said elongate slot lies in a common horizontal plane with said slot extending substantially along the length of said wall substructure.

Preferably each successive said elongate slot is spaced along each said respective engagement nest beam according to said in-stroke and out-stroke of said hydraulic ram.

Preferably said secondary mechanical system is at least partially incorporated within said material urging structure.

Preferably said secondary mechanical system comprises a pair of thrust tongue plates adapted to alternate between a first extended state so as to project from respective sides of said material urging structure and a second retracted state.

Preferably said pair of thrust tongue plates is urged between said first extended state and said second retracted state by hydraulic means.

Preferably each one of said pair of thrust tongue plates projects through respective ones of said slots extending substantially along the length of respective said wall substructures when in said first extended state.

Preferably each one of said pair of thrust tongue plates is adapted to engage with one of said elongate slots when said thrust tongue plates are in said first extended state.

Preferably each one of said pair of thrust tongue plates is caused to engage with a respective said elongate slot when each said ram of said primary mechanism is in an in-stroked state.

Preferably each one of said pair of thrust tongue plates is caused to disengage from a respective elongate slot when said thrust tongue plates are retracted into said first state.

Preferably said material urging structure is incremented between an initial position and a successive position by stroking of said hydraulic ram while each one of said pair of thrust tongue plates is engaged with said respective elongate slot.

Preferably said material urging structure is incremented forwardly when said pair of hydraulic rams out-strokes and rearwardly when said pair of hydraulic rams in-strokes.

Preferably each side wall of said side wall substructures is provided with a plurality of apertures along the length of said container structure; successive ones of said apertures spaced according to said in-strokes and outstrokes of said pair of hydraulic rams.

Preferably said secondary mechanical system includes a pair of retainer tongue plates adapted to alternate between a first extended state so as to project from respective sides of said material urging structure and a second retracted state.

Preferably said retainer tongue plates project through respective ones of said plurality of apertures when in said first extended state.

Preferably said retainer tongue plates are urged between said first extended state and said second retracted state by hydraulic means.

In a further preferred embodiment of the invention there is provided an incremental material urging system comprising;

(a) An elongate floor structure, (b) at least one guide element extending along a portion of said elongate floor structure, (c) a material urging structure adapted to incremental movement along said at least one guide element, said urging structure provided with a load urging surface normal to said floor structure and transverse to said at least one guide element, (d) a material urging structure incrementing means.

Preferably said material urging structure includes a substantially vertical surface adapted to act against moveable load objects.

Preferably said urging structure incrementing means include:

(a) at least one linear actuator, (b) a guide element clamping mechanism associated with each said at least one linear actuator.

Preferably each said at least one linear actuator is attached at a first end to a rear portion of said urging structure and at a second end to a said guide element clamping mechanism; said at least one linear actuator lying substantially in a vertical plane through a corresponding one of said at least one guide element.

Preferably said guide element clamping mechanism comprises a clamping caliper provided with gripping pads adapted to apply frictional force to each side of said at least one guide element.

Preferably said at least one linear actuator is an hydraulic ram.

Preferably a said guide element clamping mechanism is activated by an hydraulic ram.

Preferably an increment of said urging structure for the purpose of advancing said load objects along said floor structure is effected by the steps of:

(a) extension of said at least one linear actuator while said guide element clamping mechanism is activated to grip said at least one guide element, (b) deactivating said guide element clamping mechanism associated with each said at least one linear actuator, (c) retracting said at least one linear actuator.

Preferably an increment of said urging structure for the purpose of retracting said urging structure is effected by the steps of:

(a) retraction of said linear actuator while said guide element clamping mechanism associated with each said at least one linear actuator is activated to grip said guide element,
(b) deactivating said guide element clamping mechanism,
(c) extending said at least one linear actuator.

Preferably said at least one guide element is a rail.

Preferably said at least one guide element is a channel let into said elongate floor structure.

In a further preferred embodiment of the invention there is provided an incremental material urging system comprising;

(a) an elongate floor structure,
(b) at least one rail element extending along a portion of said elongate floor structure,
(c) a linear actuator linked by linking means to said at least one rail element, the axis of said actuator disposed in parallel alignment to said at least one rail element, said actuator adapted to urge reciprocating movement of said at least one rail element along said elongate floor,
(d) a material urging structure adapted to incremental movement along said at least one rail element, said urging structure provided with a vertical load urging surface normal to said floor structure and transverse to said at least one rail element,
(e) at least one urging structure clamping element, said element adapted to releasably lock said urging structure to said at least one rail element.

Preferably said material urging structure is supported on said at least one rail elements by friction reducing means.

Preferably wherein said material urging structure is supported by said floor structure by friction reducing means.

Preferably said floor structure is provided with material urging structure arresting means.

Preferably said arresting means are comprised of a plurality of vertical articulated pins disposed in pairs transverse to said at least one rail element and at intervals along the length of said at least one rail element equivalent to the stroke length of said linear actuator, said pins adapted to move between a first retracted position flush with said floor and a second extended position projecting from said floor.

Preferably said material urging structure is provided with friction pads, said pads adapted to be driven downwardly relative to said urging structure so as to provide friction sufficient to arrest said structure at an incremented position.

In a further preferred embodiment of the invention there is provided an incremental material urging system adapted to the compaction of a volume of compactable material; said system comprising:

(a) a container structure including floor, roof, and side wall structures closed at a first rearward end,
(b) a loading aperture in said roof for introducing said compactable material into said container structure,
(c) an incrementing urging structure adapted to traversing substantially the length of said container structure,
(d) a discharge gate at a second forward end of said container structure for the ejection of said compactable material.

Preferably each of said side wall structures is provided with an elongate slot extending substantially the length of said container structure; said slot communicating with the inside surface of each of said side wall structures.

Preferably said urging structure is urged into incremental horizontal motion within said container structure by two cooperating mechanical systems.

Preferably a first one of said two interacting mechanical systems is an incremental urging structure engagement mechanism.

Preferably a second one of said two interacting mechanical systems is an urging structure driving mechanism.

Preferably said incrementing urging structure is comprised of a box-like structure having at least a material urging front compacting face substantially equal in area and dimensions as the internal cross section of said container structure.

Preferably said urging structure further includes side elements, top and bottom elements adapted to permit sliding movement of said urging structure within said container structure.

Preferably said urging structure engagement mechanism is disposed within said box-like structure.

Preferably said engagement mechanism includes a pair of thrust tongue plates each disposed at one of said sides of said urging structure and urged by actuator means so as to alternate between a first inwardly retracted state and a second outwardly projecting state; the arrangement being such as to cause each said engagement plate to project outwardly through said elongate slot.

Preferably said engagement mechanism further includes a pair of retainer tongue plates each disposed at one of said sides of said urging structure and urged by actuator means to alternate between a first inwardly retracted state and a second outwardly projecting state; the arrangement being such as to cause each said retainer plate to engage with one of a plurality of retainer slots in said sidewall structures of said container structure.

Preferably said actuator means are hydraulic rams.

Preferably said urging structure driving mechanism is comprised of two concurrently operating mechanisms disposed along the outside of each of said sidewall structures.

Preferably each of said two mechanisms is comprised of an incrementing hydraulic ram and an elongate member urged into reciprocal horizontal motion by said ram.

Preferably said elongate member is provided with a plurality of equi-spaced engagement nests; each said nest including an elongate slot.

Preferably each said elongate slot of each of said engagement nests is coincident with said elongate slot in said side wall structure.

Preferably each said elongate slot of said engagement nest is adapted to receive said engagement tongue plate when said tongue plate is in said outwardly projecting state.

Preferably spacing between said engagement nests is substantially equal to the stroke of said incrementing hydraulic ram.

Preferably spacing between said plurality of retainer slots is equal to said spacing between said engagement nests.

Preferably a method for forward incremental urging of said urging structure along the length of said container structure includes the steps of:

(a) in-stroking said hydraulic rams of said driving mechanism,
(b) urging said thrust tongue plates into said second outwardly projecting state so as to engage with one of said plurality of engagement nests,
(c) out-stroking said hydraulic rams so as to urge said elongate member, said plurality of engagement nests and said urging structure one increment towards said forward end of said container structure,
(d) urging said retainer tongue plates into said second outwardly projecting state so as to engage with one of said plurality of said retainer slots, (e) urging said thrust tongue plates into said first inwardly retracted state, (f) in-stroking said hydraulic rams, (g) iterating steps (a) to (f) until said urging structure reaches a maximum forwardly incremented position.

Preferably a method for rearward incremental urging of said urging structure along the length of said container structure includes the steps of:

(a) out-stroking said hydraulic rams of said driving mechanism, (b) urging said thrust tongue plates into said second outwardly projecting state so as to engage with one of said plurality of engagement nests, (c) in-stroking said hydraulic rams so as to retract said elongate member, said plurality of engagement nests and said urging structure one increment towards said rearward end of said container structure, (d) out-stroking said hydraulic rams, (e) iterating steps (a) to (d) until said urging structure reaches a maximum rearwardly incremented position.

In a further preferred embodiment of the invention there is provided a method for the compaction and transfer to a refuse transport means of a volume of refuse, said method including the steps of:—

(a) loading a quantity of refuse material through an opening in the roof of a container structure, said container structure provided with an incrementing material urging structure and an openable discharge gate, (b) closing said opening so as to provide a sealed container envelope for said quantity of refuse, (c) incrementally advancing said urging structure to a desired degree of compaction of said refuse material, (d) aligning the loading aperture of a refuse transport means with said discharge gate of said container structure, (e) opening of said discharge gate and incrementing said material urging structure so as to discharge said refuse material into said refuse transport means.

Preferably each increment of said material urging structure from said fully retracted position towards said fully advanced position moves material towards said discharge end.

Preferably each increment of said material urging structure from said fully retracted position towards said fully advanced position moves material towards said discharge end.

In a further preferred embodiment of the present invention there is provided a method for the removal of material from the container structure of a transport vehicle, said method including the steps of:—

(a) providing said container structure with a material urging structure, said structure provided with a load urging surface having an area equivalent to the internal cross-section of said container structure, (b) activating said material urging structure with reciprocating mechanisms adapted to increment said urging structure between a first retracted end to a second discharge end.

In a further broad form of the invention there is provided a method for the movement of material along a supporting surface from a first position to a second position, said method including the steps of:—

(a) providing said supporting surface with a material urging structure, said structure provided with a load urging surface normal to said supporting surface, (b) activating said material urging structure with reciprocating mechanisms adapted to increment said urging structure between said first position and said second position.

Preferably each increment of said material urging structure from said fully retracted position towards said fully advanced position moves material towards said discharge end.

Preferably each increment of said material urging structure from said fully retracted position towards said fully advanced position moves material towards said discharge end.

Preferably each increment of said material urging structure from said fully retracted position towards said fully advanced position moves material towards said discharge end.

In a further preferred embodiment of the invention there is provided a material urging structure adapted to the transfer of material from a first loaded position to second unloaded position by incremental movements induced by reciprocating extensible urging means; where said reciprocating extensible urging means have an operating stroke significantly smaller than the separation between said first loaded position and said second unloaded position.

BRIEF DESCRIPTION OF THE DRAWINGS

Embodiments of the present invention will now be described with reference to the accompanying drawings wherein.

DETAILED DESCRIPTION OF PREFERRED EMBODIMENTS

First Embodiment

A first preferred embodiment of the invention will now be described with reference to the accompanying drawings in which a material urging system is adapted to the compaction of loose material.

Figure 1:
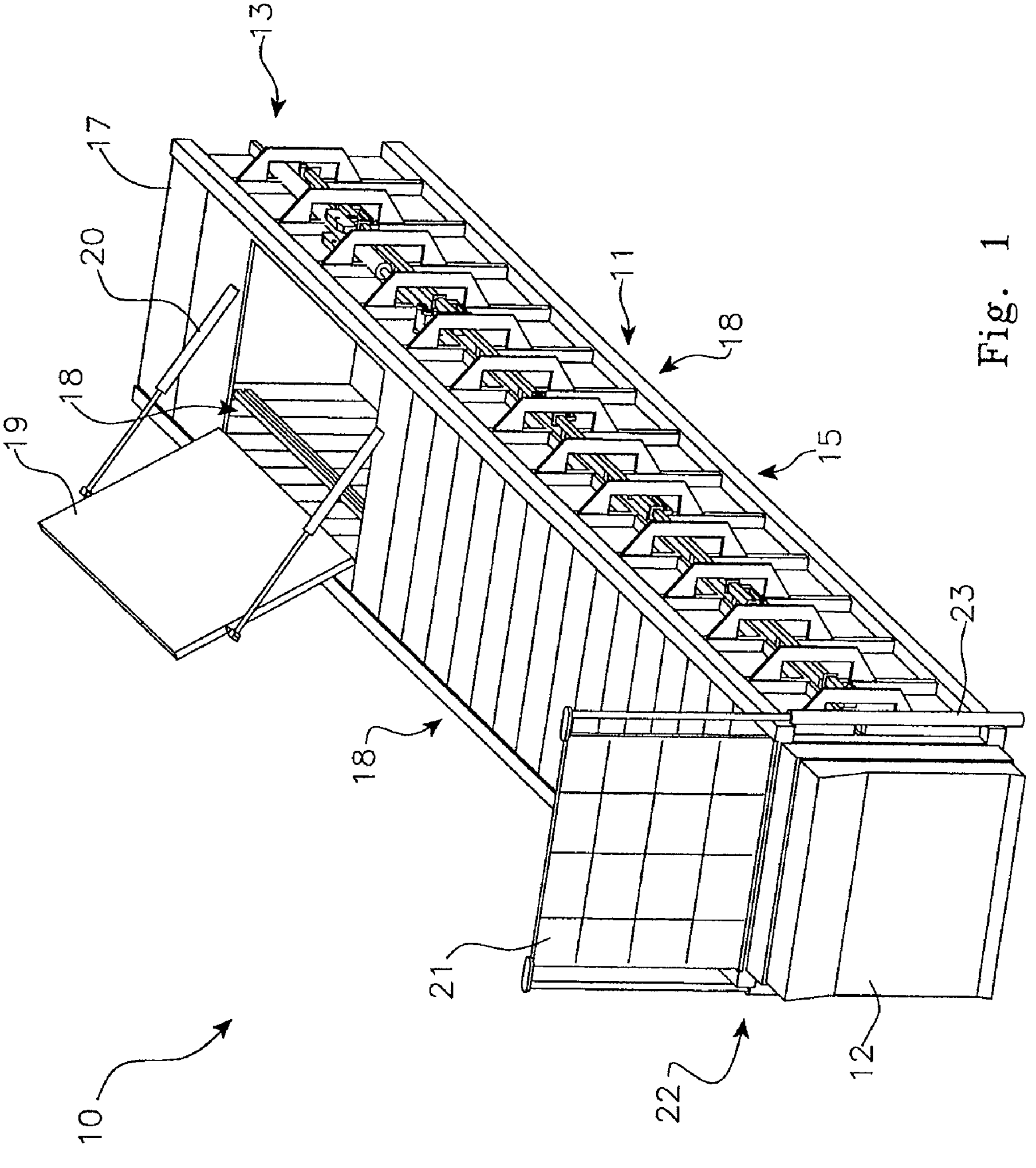
FIG. 1 is a general perspective view of the first and second preferred embodiments of the invention.

With reference to the perspective view of FIG. 1 a material urging system 10 comprises a container structure 11 including floor substructure 15, wall substructures 16, a discharge gate 21 and material urging structure 12. Roof 17 includes top opening 18 and top opening cover 19. Preferably top opening cover 19 and discharge gate 21 are operated by hydraulic rams 20 and 23 respectively.

FIG. 1 shows material urging structure 12 in its fully advanced position projecting through discharge gate opening 22 with discharge gate 21 in its open position. When material urging structure 12 is in a fully retracted position at rear end 13 of container structure 11, compactable material may be inserted into the container through top opening 18. With the top opening cover 19 closed and discharge gate 21 lowered, material urging structure 12 is driven towards the forward end 14, thereby compacting any material in the container against the discharge gate 21.

Figure 2A:
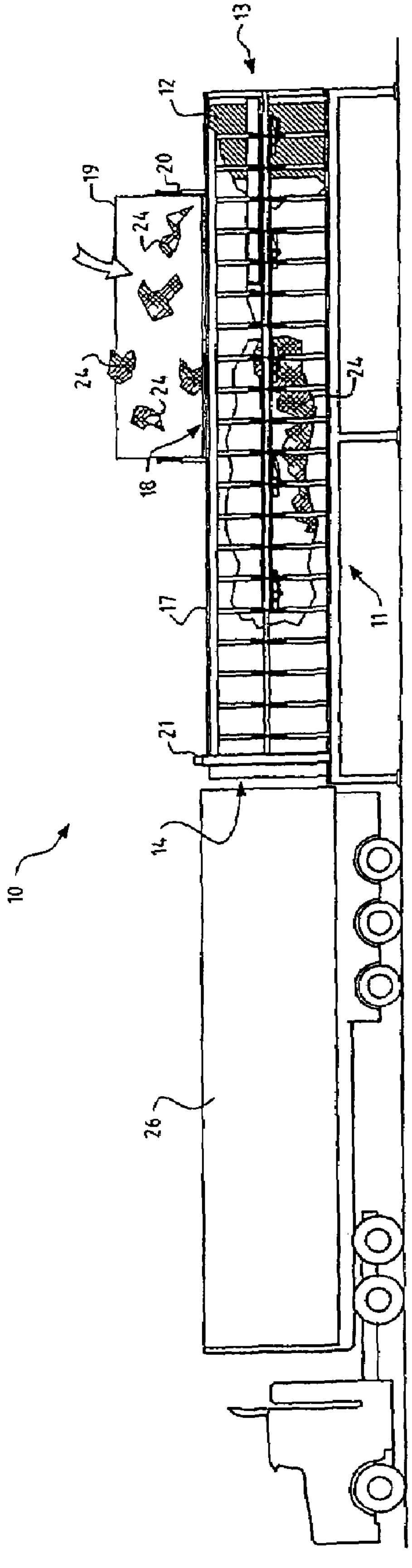
FIGS. 2*a* and 2*b* show a first and second embodiment of the invention in use.

FIG. 2*a* shows material urging system 10 in loading mode, with side wall substructure and part of internal wall sheeting removed for clarity, and where material urging structure 12 is fully retracted at rear end 13 of container structure 11 and compactable material 24 is introduced through top opening 18.

Figure 2B:
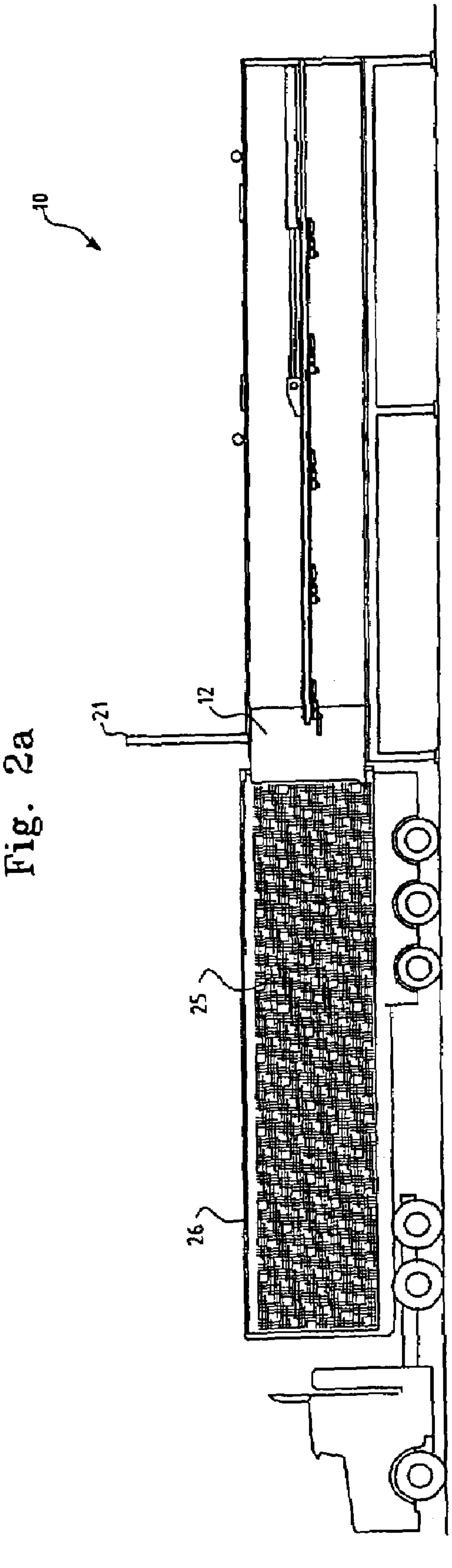

FIG. 2*b* shows material urging system 10 with side wall substructure 16 removed for clarity, and where compacted material 25 has been ejected through opened discharge gate 21 into transport vehicle 26.

The process of compaction of compactable material according to this first embodiment of the invention will now be described in more detail.

Figure 3:
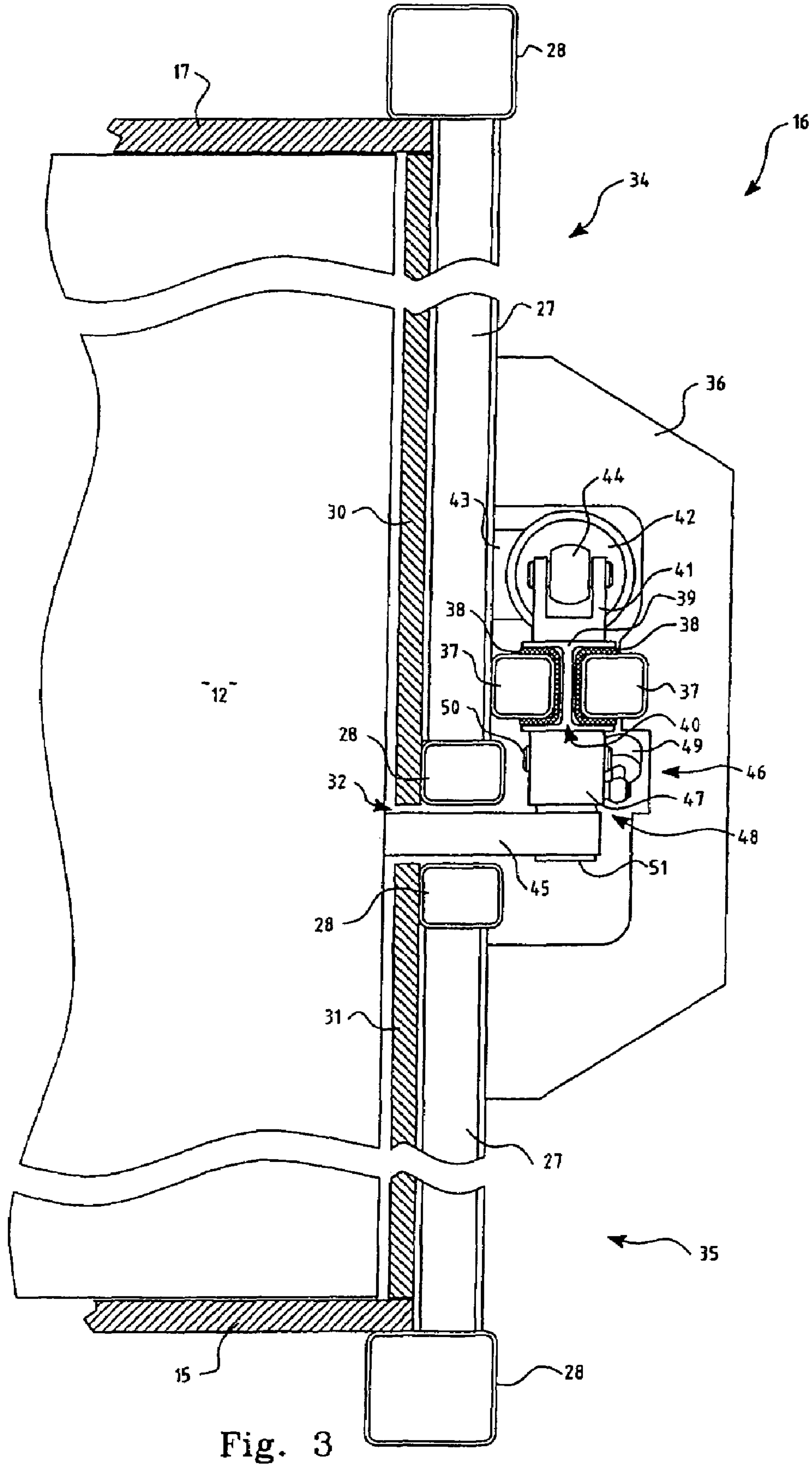
FIG. 3 is a cross-section view of a side wall substructure according to the first preferred embodiment of the invention, FIG. 4A and detail 4B are side views of the side wall substructure of FIG. 3, FIGS. 5*a* to 5*d* show a first operating sequence of a component of part of the first preferred embodiment of the invention.

FIG. 3 is a cross section of a wall substructure 16 as viewed from the forward end 14 of container structure 11. It should be noted that the wall substructure 16 and all associated components shown in FIGS. 3 and 4 are symmetrically duplicated for the opposite side wall of container structure 11 and the mechanism hereinafter described works in unison on both sides of the container structure.

Figure 4A:
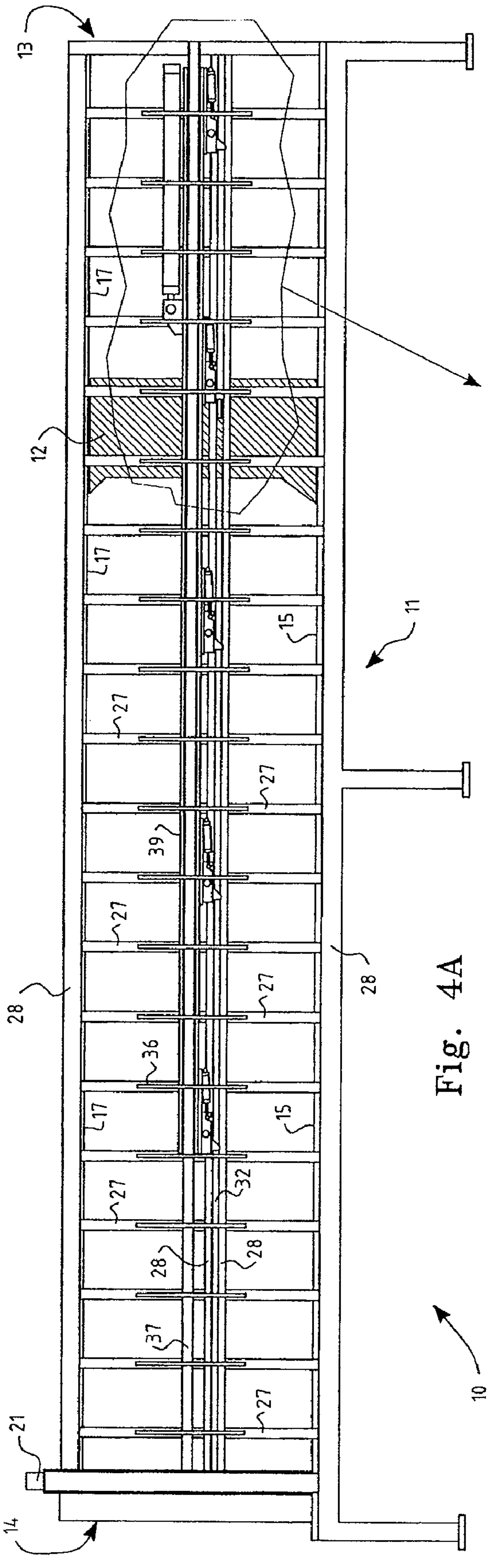
Figure 4B:
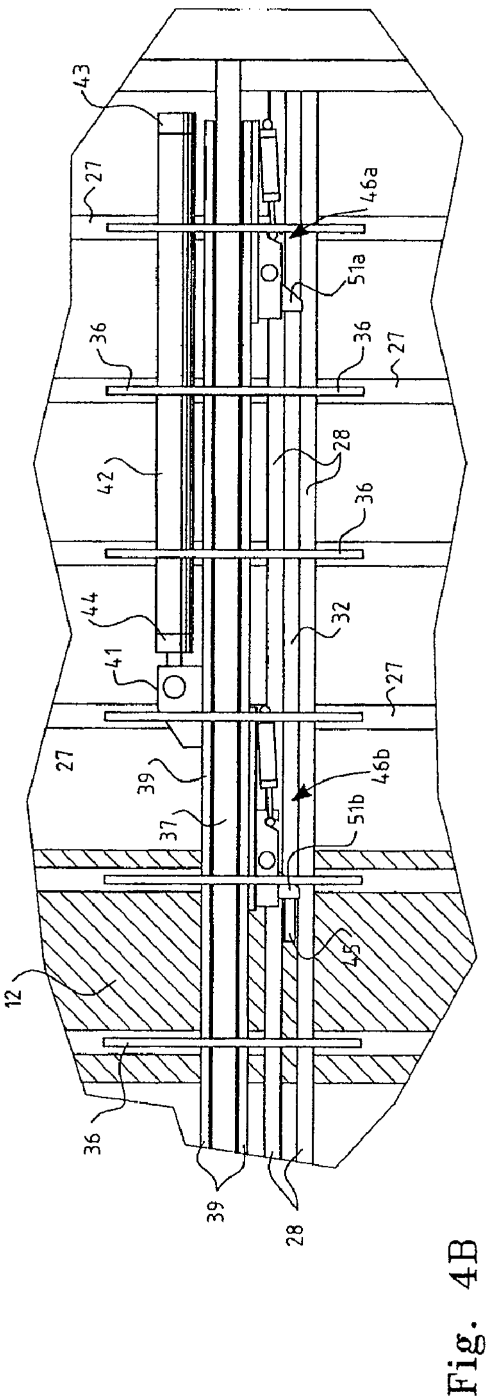

Wall substructure 16 includes upper frame structure 34 and lower frame structure 35 made up of a plurality of vertical frame members 27 and horizontal frame members 28 (as further illustrated in FIG. 4). Affixed internally to upper frame structure 34 and lower frame structure 35 are upper wall sheeting portion 30 and lower wall sheeting portion 31 respectively.

The upper and lower portions of wall sheeting 30 and 31 and frame structures 34 and 35, are separated so as to form a horizontal slot 32 extending substantially for the length of the container structure 11. Joining webs 36 are rigidly connected to each corresponding upper and lower vertical frame member 27 to effectively combine upper and lower frame structures 34 and 35 into a unified rigid structure.

Still with reference to FIG. 3, a pair of longitudinal rail members 37 disposed side by side are provided of which the inner rail member is attached to upper wall section vertical frame members 27 and the outer rail member is attached to the joining webs 36. Rail members 37 are spaced apart so as to leave a vertical slot 40 between their adjoining sides. Rail members 37 extend the length of container structure 11 and are preferably in the form of rectangular section steel tubing. The upper, lower and adjoining surfaces of longitudinal rail members 37 are provided with bearing strip material 38.

Interposed between adjoining longitudinal rails 37 is an I-beam 39 oriented so that its central web hangs vertically in slot 40 with the underside surfaces of its upper flange supported on the bearing strip material 38 covering the upper surfaces of longitudinal rail members 37. The sizes of rail members 37, I-beam 39 and bearing strip material 38 are so chosen as to allow a sliding fit reciprocating movement of I-beam 39 on rails and bearing strips.

Attached to the upper flange of I-beam 39 is thrust block 41. A main hydraulic ram 42, attached to wall substructure 16 at the ram's passive end 43, and to thrust block 41 at its rod end 44, is adapted to impart the reciprocating movement to I-beam 39.

Attached to the lower flange of I-beam 39 is a plurality of thrust assemblies 46*a* to 46*n*. Each thrust assembly 46 includes a double ended pawl 48 of which a first end 51 is visible in FIG. 3. Pawl 48 is mounted on pivot shaft 50 supported in thrust assembly support 47 and may be rotated about pivot shaft 50 by pawl actuator means 49 so as to bring one of its ends down to the level of slot 32; its other end then having been rotated into a position above and clear of the level of slot 32.

Material urging structure 12 is adapted to slide on floor 15 and is a close sliding fit between internal wall sheeting 29 and roof 17. Each side of material urging structure 12 is provided with projecting lug 45, adapted to extend through slot 32 so as to engage with one end of double ended pawl 48.

FIG. 4A and detail 4B show side views of material urging system 10 from which the internal wall sheeting has been omitted for clarity.

Material urging structure 12 shown as hatched, has been moved towards the discharge gate 21 of container structure 11 to the position shown, by a first extension stroke of hydraulic ram 42 acting on I-beam 39. First movement of I-beam 39 was transferred to projecting lug 45 through pawl first end 51*a* of thrust assembly 46*a*. As shown in FIG. 4, main ram 42 is in its retracted state ready to move material urging structure 12 a second increment towards the discharge gate by driving pawl end 51*b* of thrust assembly 46*b* against projecting lug 45.

The interaction of material urging structure 12 projecting lug 45 and a thrust assembly 46 will now be described in detail with reference to FIGS. 4A and detail 4B and 5*a* to 5*d*. Again it should be noted that the actions described are symmetrically duplicated for both sides of container structure 11.

Figure 5A:
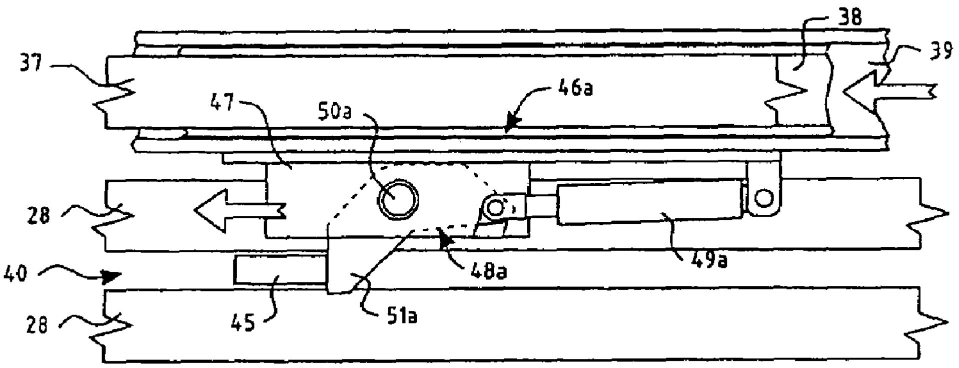

At the start of a compaction sequence, material urging structure 12 is fully in its retracted position at rear end 13 of container structure 11 (FIGS. 4A and detail 4B). As shown in FIG. 5*a*, projecting lug 45 is then forward, (that is towards the forward end 14), of thrust assembly 46*a*. At this stage, thrust assembly pawl actuator 49*a* is in retracted mode which has rotated first end 51*a* of pawl 48*a* in forward thrust position. Main ram 42 now extends for a first compaction stroke, sliding I-beam 39 forward together with thrust assembly 46*a*, to force lug 45 and hence material urging structure forward to a first incremented position.

Figure 5B:
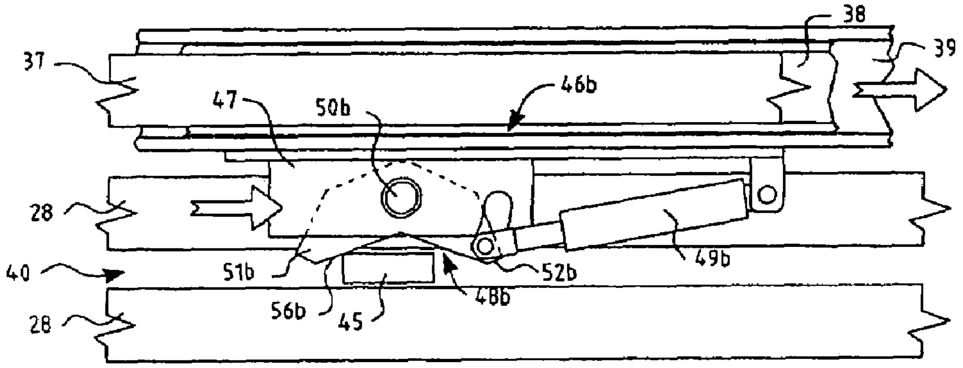
Figure 5C:
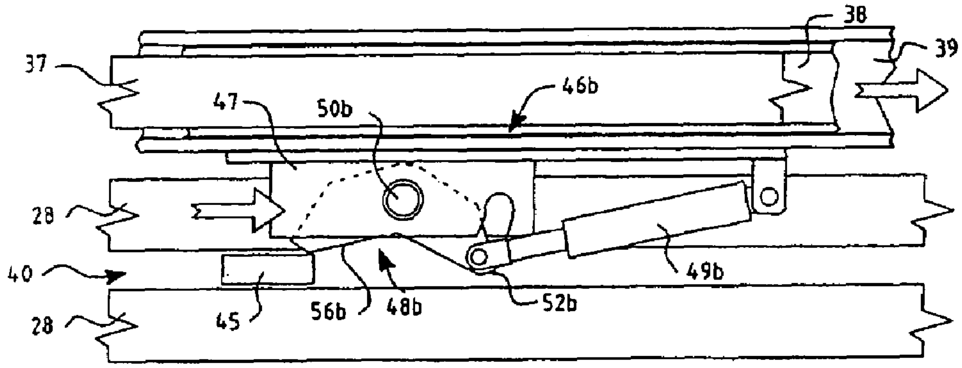
Figure 5D:
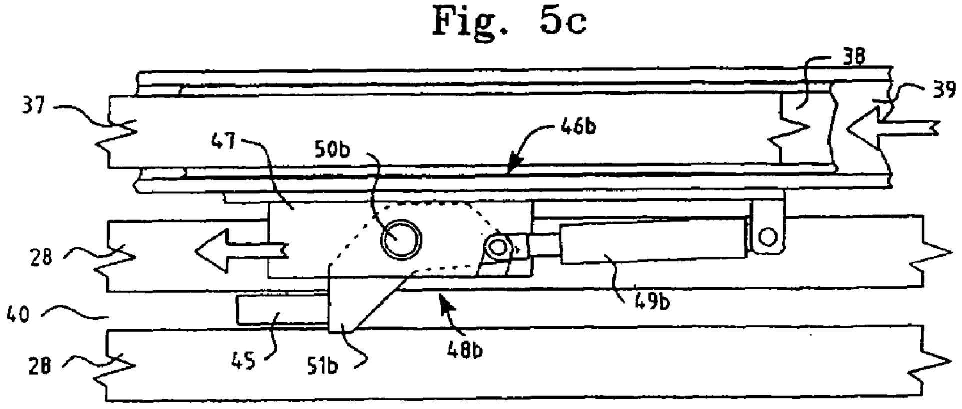

Hydraulic ram 42 now retracts, to pull I-beam 39 back to its initial position. This requires second thrust assembly 46*b* to pass the projecting lug 45 as shown in FIGS. 5*b* and 5*c*. This is achieved by de-activating pawl actuator 49*b*, allowing double ended pawl 48*b* to rotate about pawl pivot shaft 50*b* as upwardly sloping face 56*b* is forced against the lug 45. When ram 42 is fully retracted, pawl actuator 49*b* is returned to its retracted position, thus rotating first end 51*b* of pawl 48*b* to its forward thrust position as shown in FIG. 5*d.*

This sequence is repeated until material urging structure 12 reaches a point of maximum or desired compaction. Discharge gate 21 is then opened and the compacted material incrementally advanced until material urging structure 12 reaches its forward limit at forward end 14 of container structure 11, projecting through opened discharge gate 21.

Depending on the material being compacted, the material urging structure 12 may be subject to a degree of "spring-back", especially as maximum compaction is approached towards the end of the compaction process. This can force the urging structure back into a position where the next thrust assembly cannot be retracted back past the projecting lug and hence no further incremental movement of the urging structure is possible. To prevent this situation, material urging structure 12 may be fitted with braking or locking means which are activated during the retraction of I-beam 39 and until the double ended pawls are returned to the forward thrust position.

For the incremental movements towards forward end 14, main ram 42 does not out-stroke to its full extent, the stroke being controlled by suitable limit switches. This is to allow the furthest forward thrust assembly 46*n* to be driven just past lug 45, (when second end 52*n* has been rotated to its reverse thrust position and its actuator is de-activated), by a full extension of the main ram 42. After extending pawl actuator 49*n* to reset second end 52*n* to the reverse thrust position, the first return increment of material urging structure 12 towards rear end 13 of container structure 11 may be made.

Figure 6A:
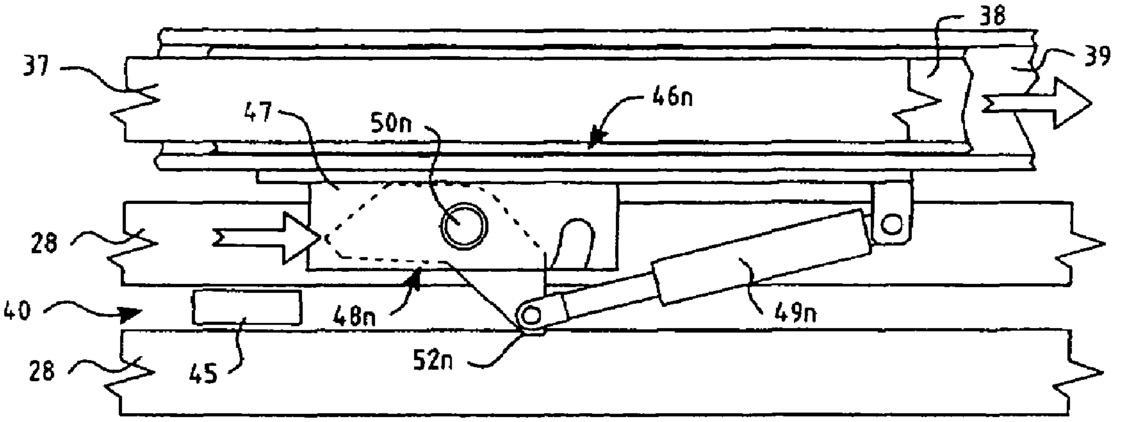
FIGS. 6*a* to 6*c* show a second operating sequence of the component of FIGS. 5*a* to 5*d*.
Figure 6B:
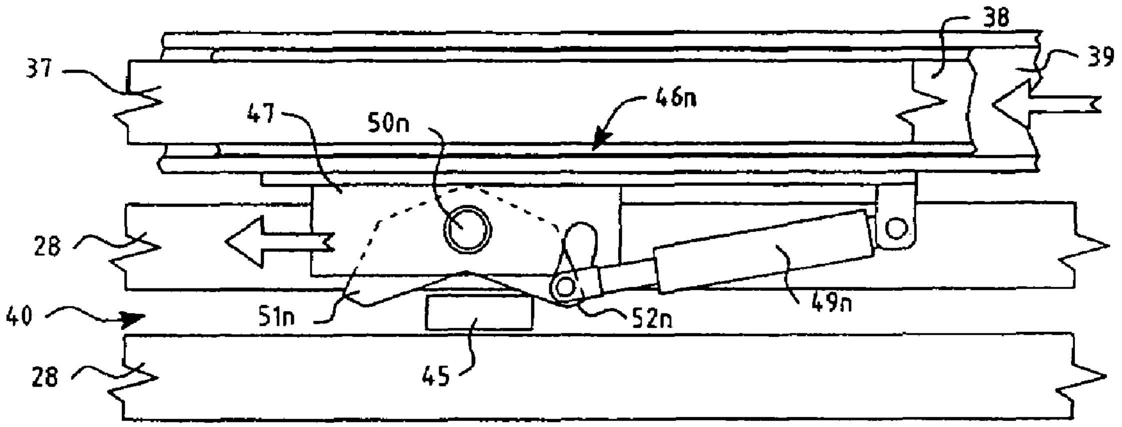
Figure 6C:
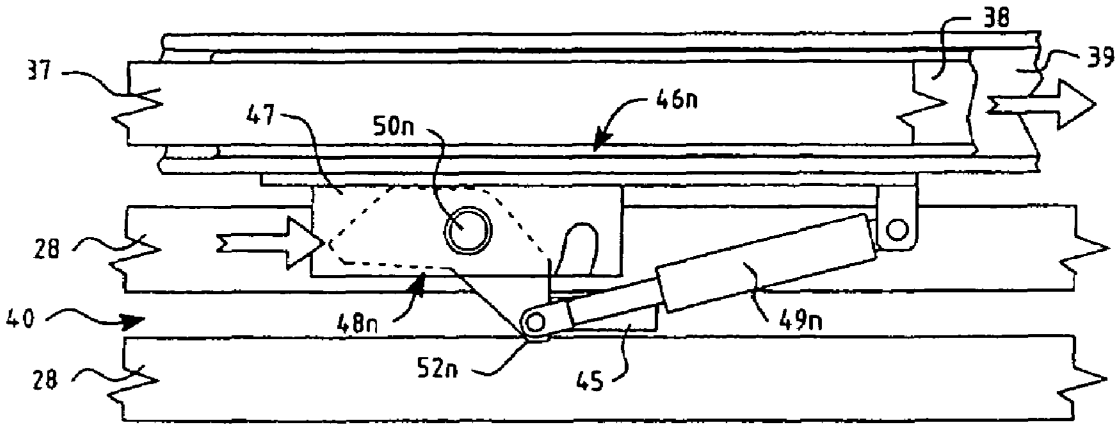

This process is shown in FIGS. 6*a* to 6*c*. Initially I-beam 39 with thrust assembly 46*n* is partially retracted by main ram 42 to allow pawl actuator 49*n* to extend, thereby rotating pawl 48*n* to bring second end 52*n* of pawl 48*n* into its reverse thrust position as shown in FIG. 6*a.*

With pawl actuator 49*n* de-activated, thrust assembly 46*n* is pushed past lug 45 by the full extension of main ram 42 as shown in FIG. 6*b*. Pawl actuator 49*n* now extends to reset second end 52*n* to its reverse thrust position as shown in FIG. 6*c*. Retraction of main ram 42 now forces material urging structure 12 into a first retracted position. Extension of main ram 42, (while pawl actuator 49*n*- 1 is de-activated), allows thrust assembly 46*n*-1 to be pushed past lug 45. After second end 52*n*-1 of pawl 48*n*-1 has been set to its reverse thrust position, the next retraction of ram 42 forces the material urging structure 12 into a second retracted position.

This sequence is repeated until the material urging structure 12 is returned to its fully retracted position at rear end 13 of container housing 11. The retraction strokes of main ram 42 for the incremental retraction of material urging structure 12 are shorter than the full retraction stroke of main ram 42, the stroke being limited by suitable limit switches. This is to allow the first thrust assembly 46*a* to be retracted past lug 45 by a full retraction of the ram to re-commence the incremental compaction sequence described above.

In use, the incremental advance of the material urging structure towards the forward end of container structure 11, occurs once a quantity of compactable material has been introduced into container structure 11 and both the top opening cover 19 and discharge gate 21 are closed. When a desired degree of compaction has been achieved at some point during the advance of material urging structure 12, discharge gate 21 is opened and the compacted material ejected by the completion of the incremental advance of the urging structure.

As an aid to the compaction process, an optional intermediate compaction gate may be located at some point between the top opening and the discharge gate. This allows smaller quantities of refuse material to be compacted and, once compacted, to be pushed past the intermediate gate. This has the advantage of achieving a higher compaction density of the final compacted load available for transfer to the refuse transport vehicle.

Second Embodiment

In a second preferred embodiment of the invention, the construction of the container structure is as that previously described for the First Embodiment above and, as before, both sides of the container structure are symmetrical and carry symmetrical mechanical systems. Like features are numbered as for the first embodiment but with the addition of 100 so that for example feature 39 is number 139 in this embodiment and so forth.

Figure 7:
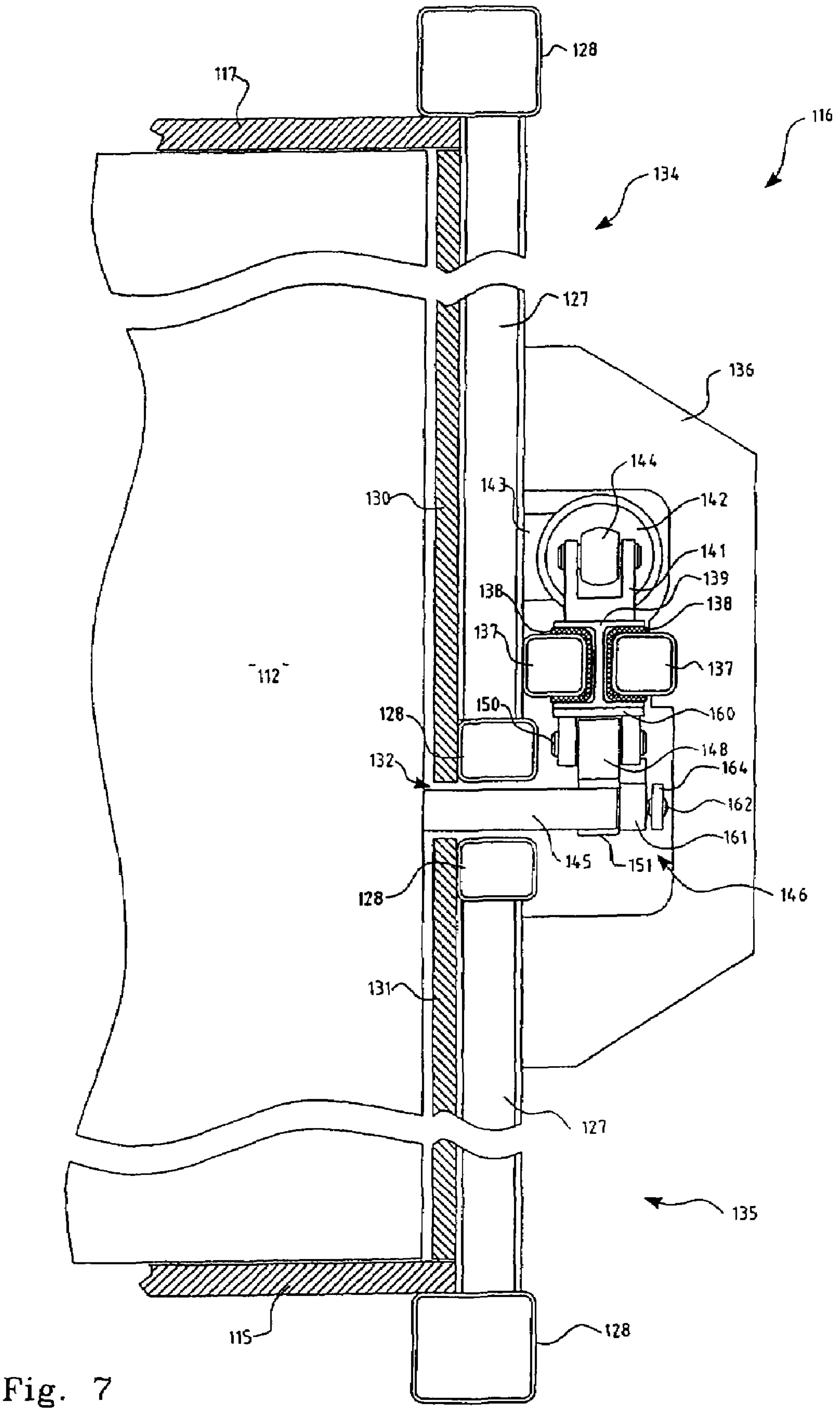
FIG. 7 is a cross-section view of a side wall substructure according to the second preferred embodiment of the invention.

With reference to FIG. 7 I-beam 139 is supported by twin longitudinal rail members 137 and is connected to main hydraulic ram 142 via thrust block 141. Attached at intervals along the underside of I-bean 139 are thrust assemblies 146, the end view of one of which, as seen from the forward end of the container structure 111, is shown in FIG. 7. In this embodiment thrust assembly 146 is comprised of clevis mount 160 carrying pawl pivot shaft 150 about which rotates double ended pawl 148. Rigidly connected to pawl 148 as may best be seen in FIG. 8*a,* is control bracket 161 which in turn carries control pivot shaft 162. Again with reference to FIG. 8*a,* control pivot shaft 162 is pivotally connected by means of bearing 163 to control arm 164.

Figure 8A:
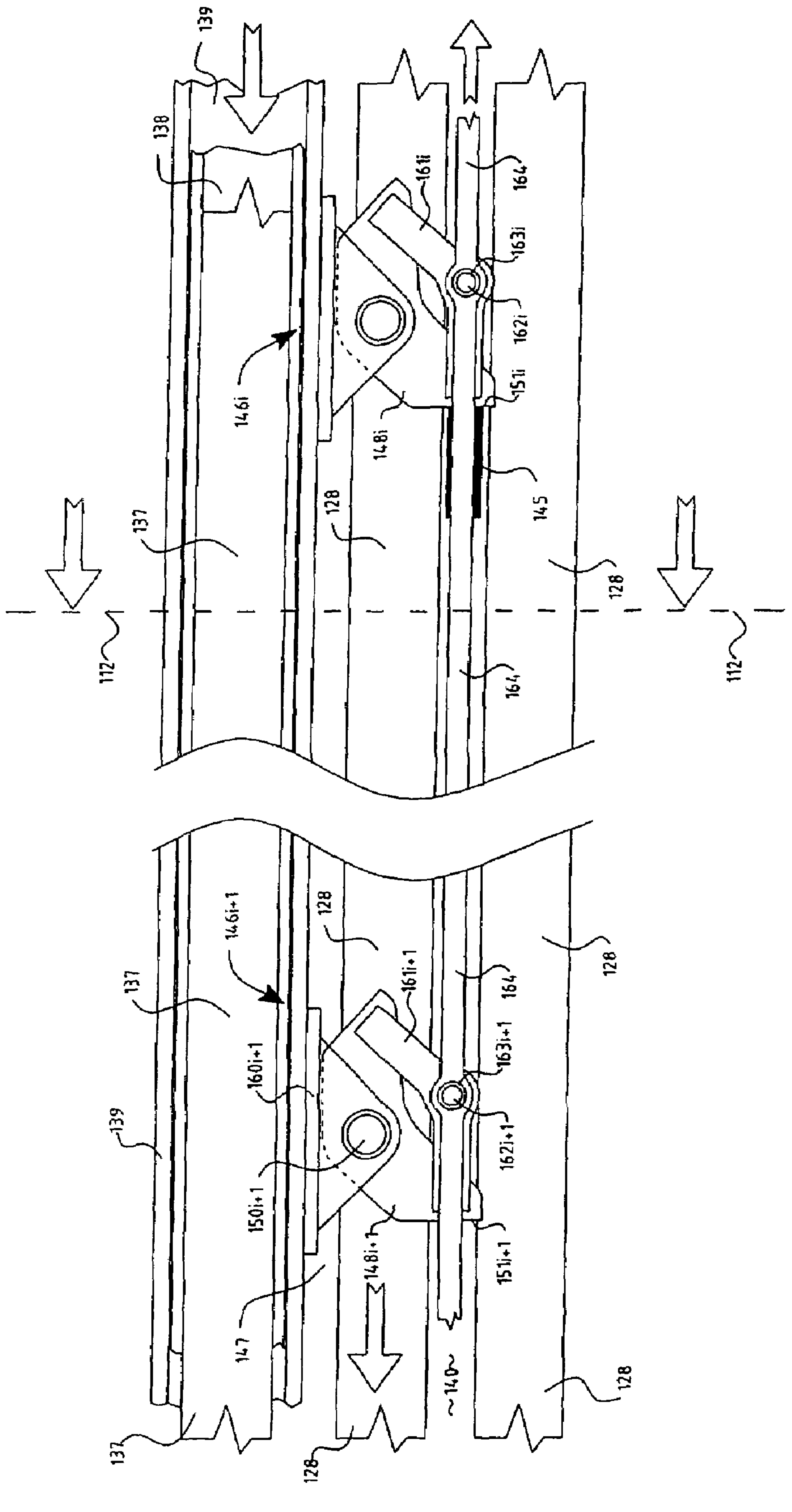
FIGS. 8*a* to 8*b* show a first operating sequence of a component part of the embodiment of FIG. 7, FIGS. 9*a* to 9*c* show a second operating sequence of a component part of the embodiment of FIG. 7, FIGS. 10*a* and 10*b* show a third operating sequence of a component part of the embodiment of FIG. 7.
Figure 8B:
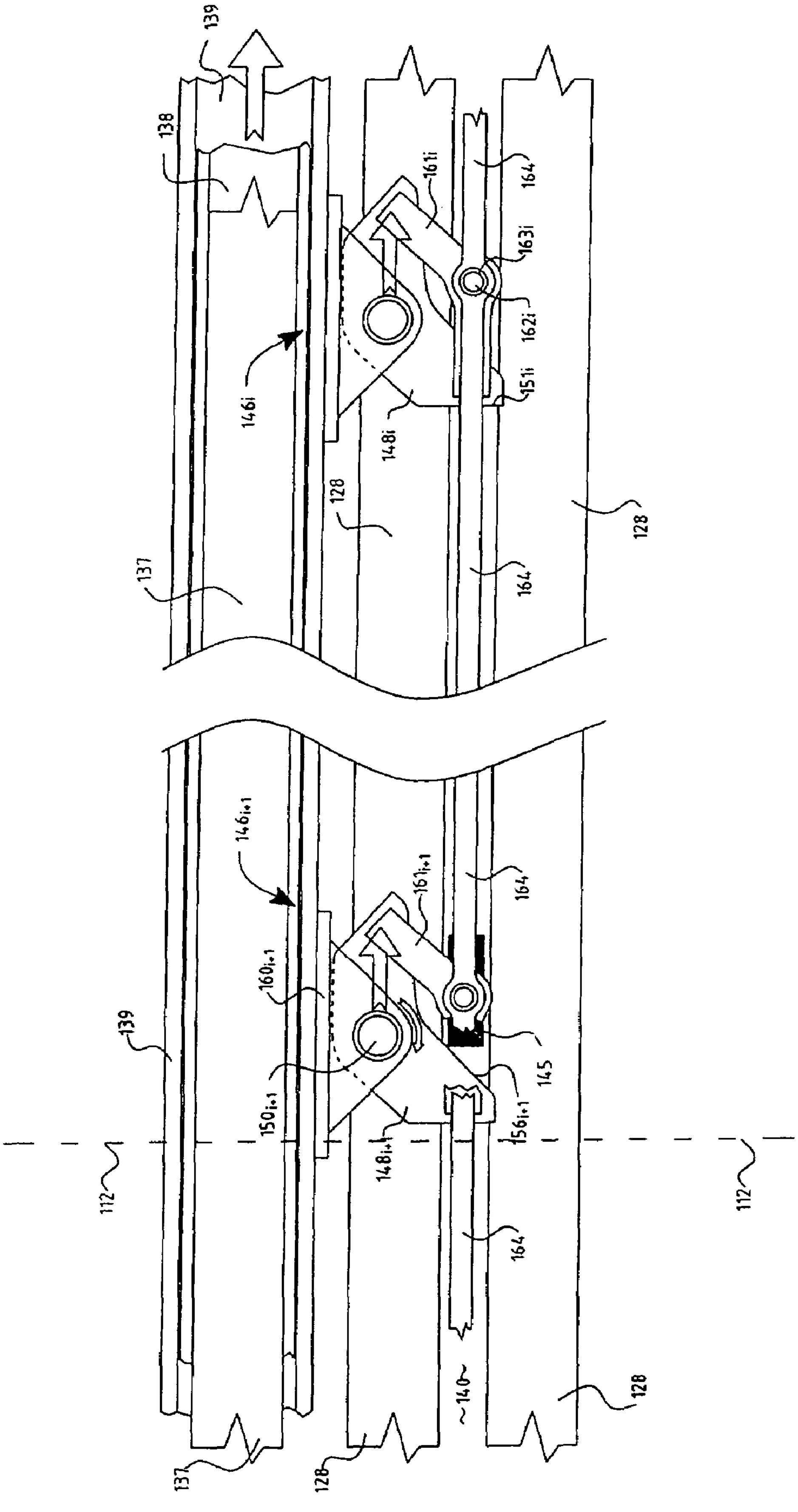

Control arm 164 similarly connects to each of the control pivot shafts 162 of each of the thrust assemblies 146 whereby reciprocating movements of control arm 164 have the effect of rotating the attitude of double ended pawls 148 between a forwardly incrementing thrust position as in FIG. 8*a* and a rearwardly incrementing thrust position as in FIG. 8*b.*

Control arm 164 is connected to a pawl control actuator 166 (shown in FIG. 10*a*), such as an hydraulic ram, mounted to I-beam 139 at rear end 113 of container structure 111, so that by the operation of this single actuator, the operating positions of all double ended pawls may be changed in unison.

Intermediate Incrementing of Material Urging Structure

With reference to FIG. 8*a,* at the beginning of an intermediate increment of the material urging structure 112 towards the forward end 114 of container structure 111, the pawl control actuator is in its retracted position so that control arm 164 has rotated all double ended pawls 148 into the forwardly incrementing thrust position as shown in FIG. 8*a.* I-beam 139 is now urged towards forward end 114 by the extending of main ram 142.

This brings first end 151(*i*) of pawls 148(*i*) of that thrust assembly 146(*i*) which is closest to projecting lug 145 of the material urging structure 112 (represented in FIGS. 8*a* to 8*b* by a dashed line) into contact with projecting lug 145, thereby driving the material urging structure forward towards forward end 114. Thus in FIG. 8*a,* it is first end 151(*i*) of double pawl 148(*i*) of thrust assembly 146(*i*) which has contacted projecting lug 145 and drives material urging structure 112.

When this stroke of I-beam 139 has reached its limit, pressure is released from the pawl control actuator and I-beam 139 is retracted by hydraulic ram 142. Towards the end of this retraction stroke, the next forward thrust assembly 146(*i*+1) to assembly 146*i* just used to drive the material urging structure forward, has to pass the projecting lug 145. This situation is shown in FIG. 8*b*, (in which the control bracket 161(*i*+1) and control arm 164 have been partly removed for clarity) where thrust assembly 146(*i*+1) has reached projecting lug 145. As thrust assembly $\mathbf{146}_{i+1}$ continues to be retracted, double ended pawl 148(*i*+1) is forced to rotate about pawl pivot shaft 150(*i*+1) as the upwardly sloping face 156(*i*+1) is forced against projecting lug 145.

This rotation continues until first end 151 (*i*+1) of double ended pawl 148(*i*+1) slides over the top of projecting lug 145 as shown in FIG. 8*b*. At the limit of retraction of I-beam 139, double ended pawl 148(*i*+1) (together with all double ended pawls of the thrust assemblies) is rotated back into the forward thrust position of FIG. 8*a* by the retraction of the pawl control actuator.

This sequence is repeated until material urging structure 112 reaches a point of maximum or desired compaction. Discharge gate 21 is then opened and the compacted material incrementally advanced until the material urging structure reaches its forward limit at forward end 114 of container structure 111, projecting through opened discharge gate 121.

To prevent "spring-back" of the material urging structure 112 induced by the compacted material driven before it, urging structure 112 may preferably be fitted with braking or locking means to retain its incremented position while thrust assemblies are being retracted for a next forward increment.

First Return Increment

Figure 9A:
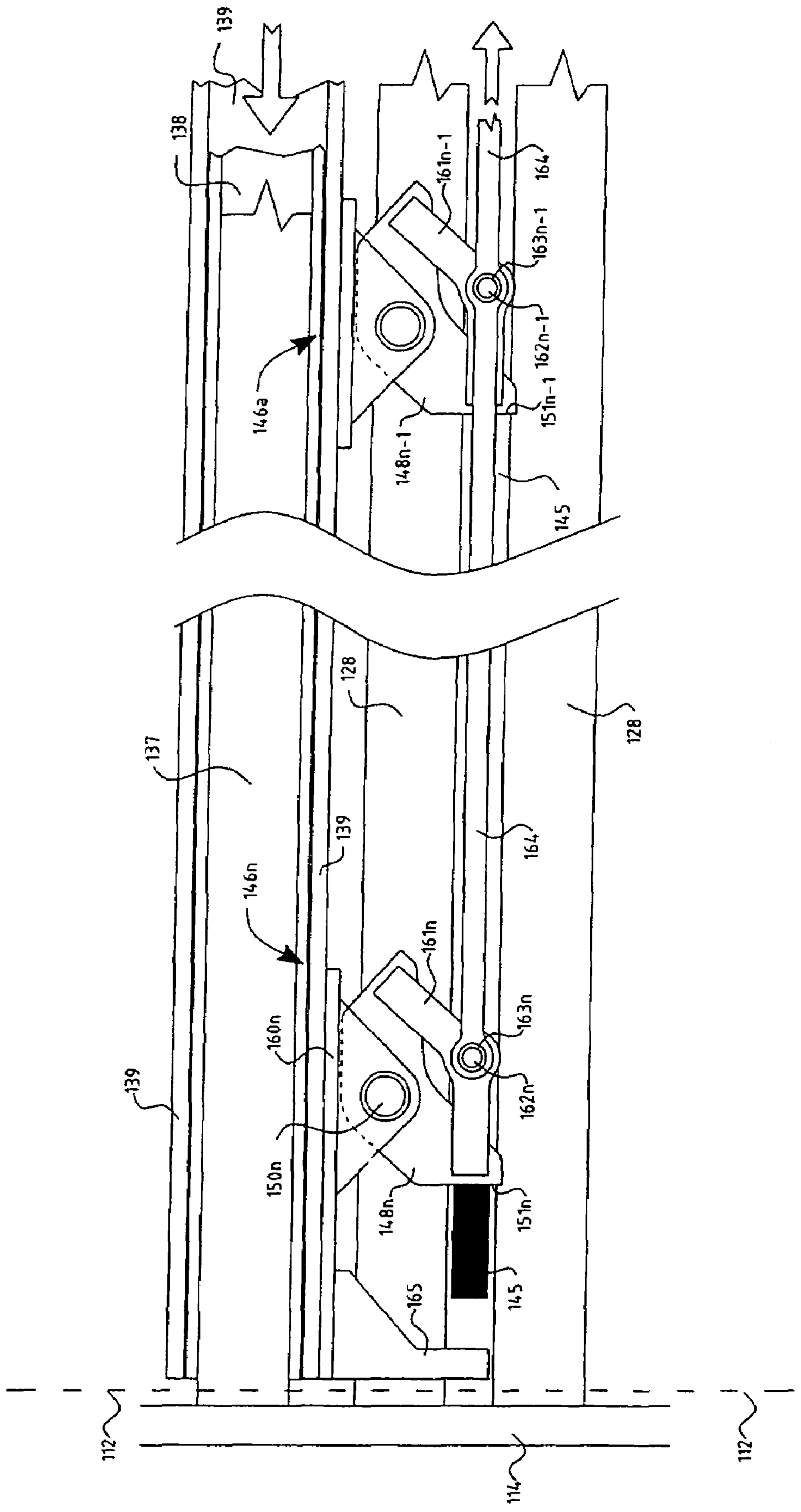

The final forward incremental stroke of the main rams drives the material urging structure through the discharge gate sufficiently far to completely push the compacted material into the adjoining transport vehicle as shown in FIG. 2*b*. At this point the furthest forward thrust assembly 146*n* which has moved the urging structure to this final discharge position remains behind the projecting lug 145 of the urging structure. To make the initial incremental return of the urging structure, a return thrust block 165 is attached to the end of I-beam 139 just forward of the furthest forward thrust assembly 146*n* as shown in FIG. 9*a*.

Figure 9B:
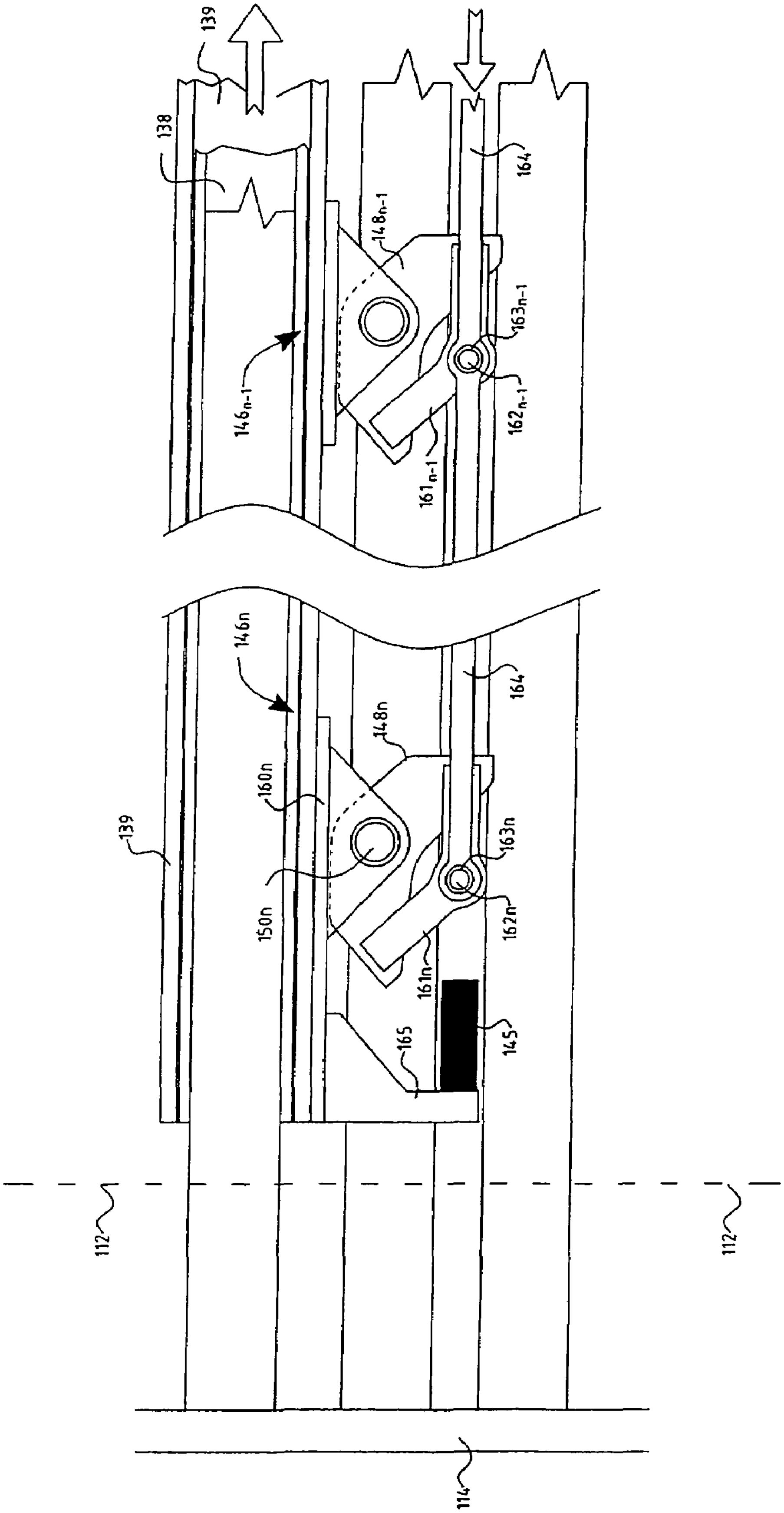
Figure 9C:
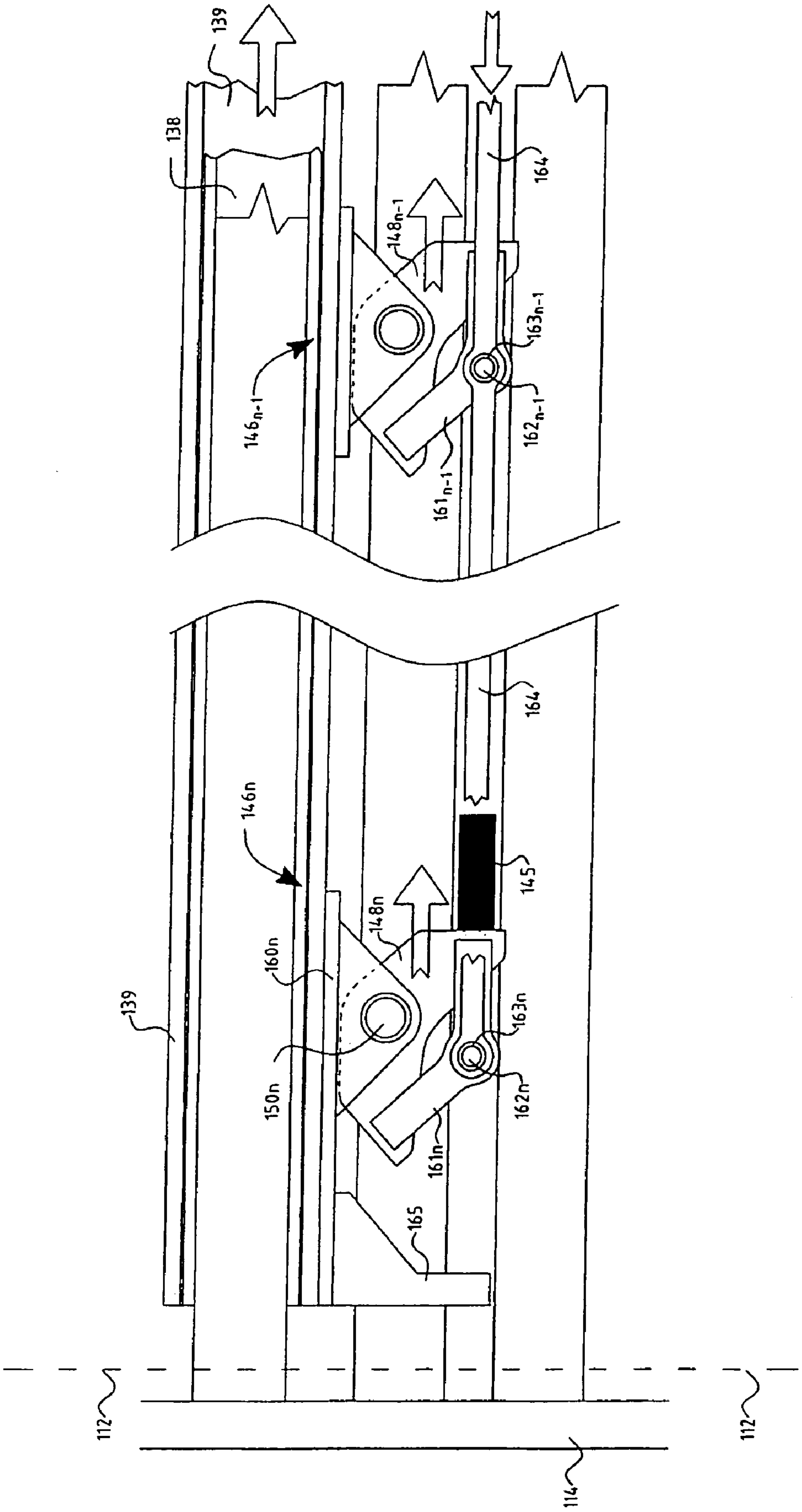

When I-beam 139 is retracted, thrust return block 165 acts on projecting lug 145 and material urging structure 112 is moved a first partial return increment towards the rear end 113 of container structure 111. The pawl control actuator now extends to rotate double ended pawls 148*n* into their return thrust position as shown in FIG. 9*b*. With pressure released from the pawl control actuator to allow rotation of double ended pawl 148*n* through contact with the projecting lug 145, I-beam 139 is now driven forward, pushing thrust assembly 146*n* past projecting lug 145. The pawl control ram now extends to return double ended pawls 148*n* into the return thrust position shown in FIG. 9*c* enabling the retraction stroke of I-beam 139 to complete the first return increment of material urging structure 112 towards rear end 113.

The remaining returning increments are a reverse procedure of the intermediate incrementing sequence described above.

First Forward Increment

Figure 10A:
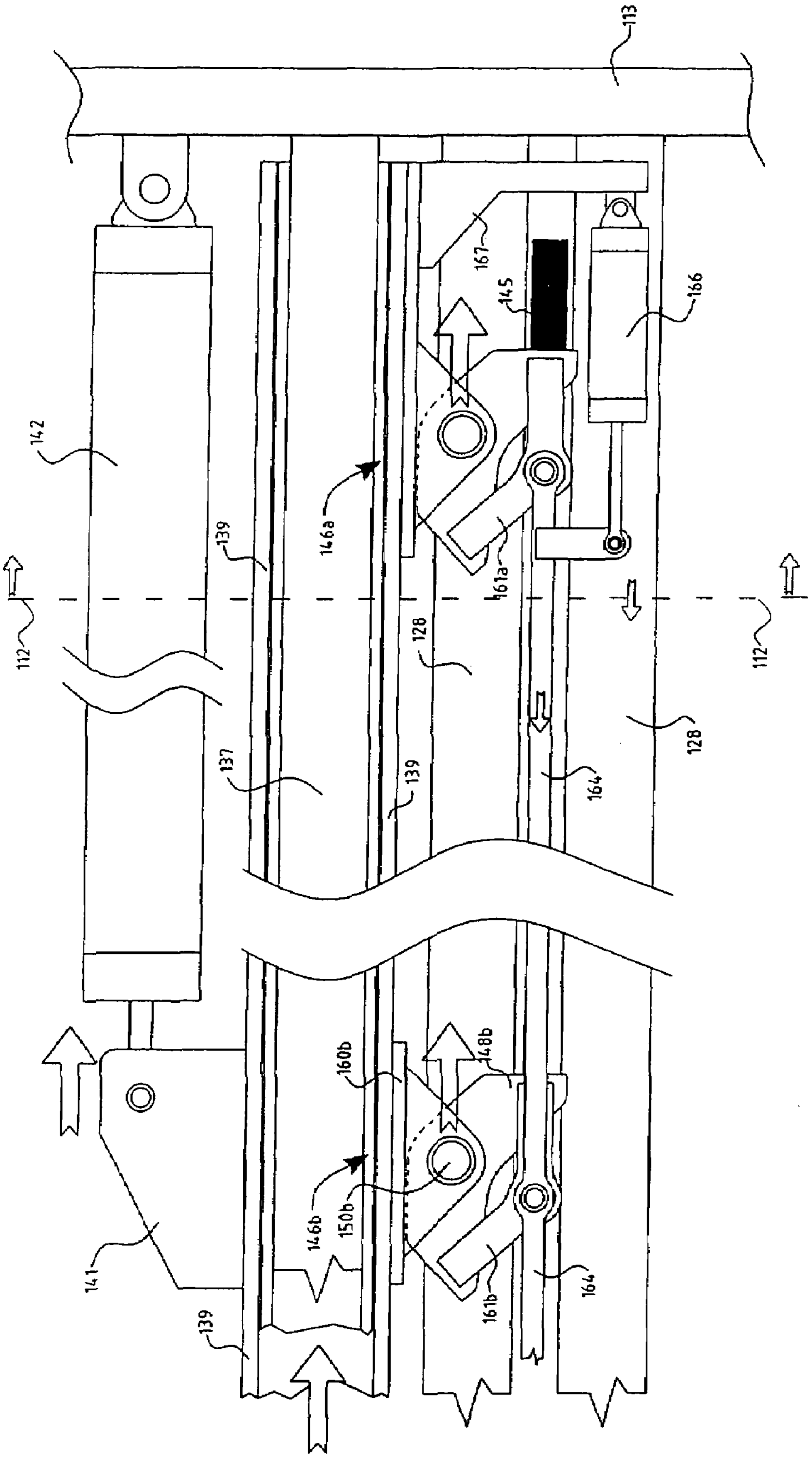

The final rearward incremental retraction of the main rams 142 causes projecting lug 145 to reach the position at rear end 113 of container structure 111 as shown in FIG. 10*a*. I-beam 139 is provided at this end with a forward thrust block 167.

Figure 10B:
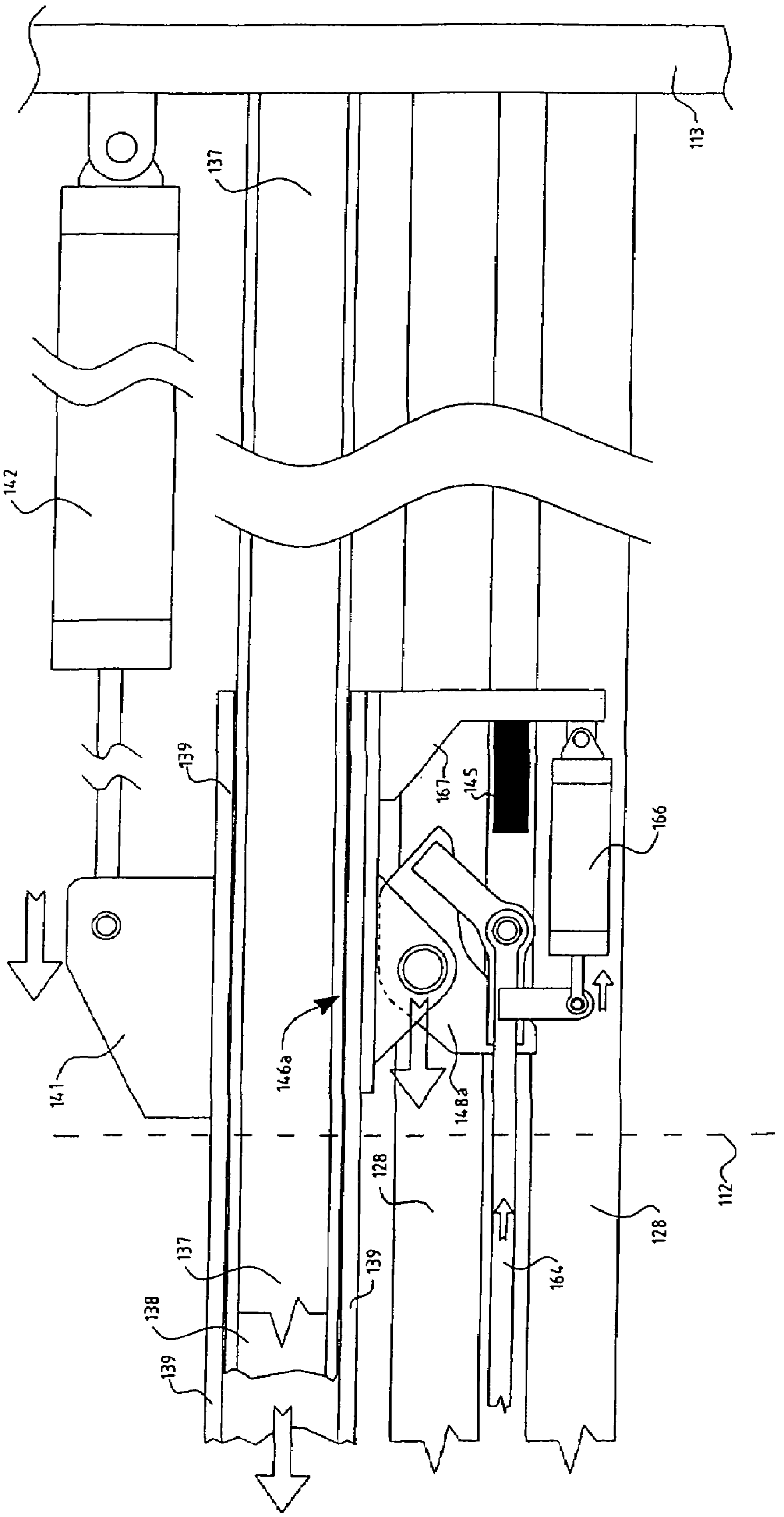

At the first extension of main ram 142 from this position of the material urging structure 112 at rear end 113, it is the forward thrust block 167 which pushes the projecting lug 145 and hence material urging structure 112 forward to the first partially incremented position shown in FIG. 10*b*. When this position has been reached, pawl control actuator is retracted to rotate double ended pawl 148*a* into its forward thrust position as shown in FIG. 10*b*.

Pressure is then released from the pawl control actuator and the I-beam retracted to pull thrust assembly 146*a* past projecting lug 145. Pawl control actuator 166 then retracts to return double ended pawls 148*a* into their forward thrust position. The main ram 142 then extends to complete the first incremental advance of the material urging structure, followed by the intermediate increment sequence described above.

As with the first embodiment, in this embodiment of the invention also, the container structure may optionally be fitted with an intermediate compaction gate to allow the sequential assembling of a full compacted load from smaller compacted quantities of waste material.

Although both the first and the second embodiments described above are directed at compaction and the incremental urging mechanisms act in conjunction with a container structure, the principle of the mechanisms may be applied for example to drive solid materials along a supporting surface. Thus the system may be adapted to drive an array of palletized materials or containers along the length of a loading dock for transfer into a transport vehicle. In such a system the urging mechanisms may be disposed at floor level or recessed into channels along both sides of the dock with the equivalent of the material urging structure adapted to slide on the surface of the loading dock or on suitable friction reducing means such as rails or wheels or a combination of these.

Third Embodiment

While uni-directional compaction of a volume of refuse as described in the above embodiments greatly reduces the cost of waste handling and transportation, greater compaction and further economies can be achieved by applying compressive forces in more localized areas and in different directions within the refuse volume.

There are therefore provided in this embodiment additional devices which may optionally be fitted to the container structure of the first and second embodiments as previously described.

Figure 11:
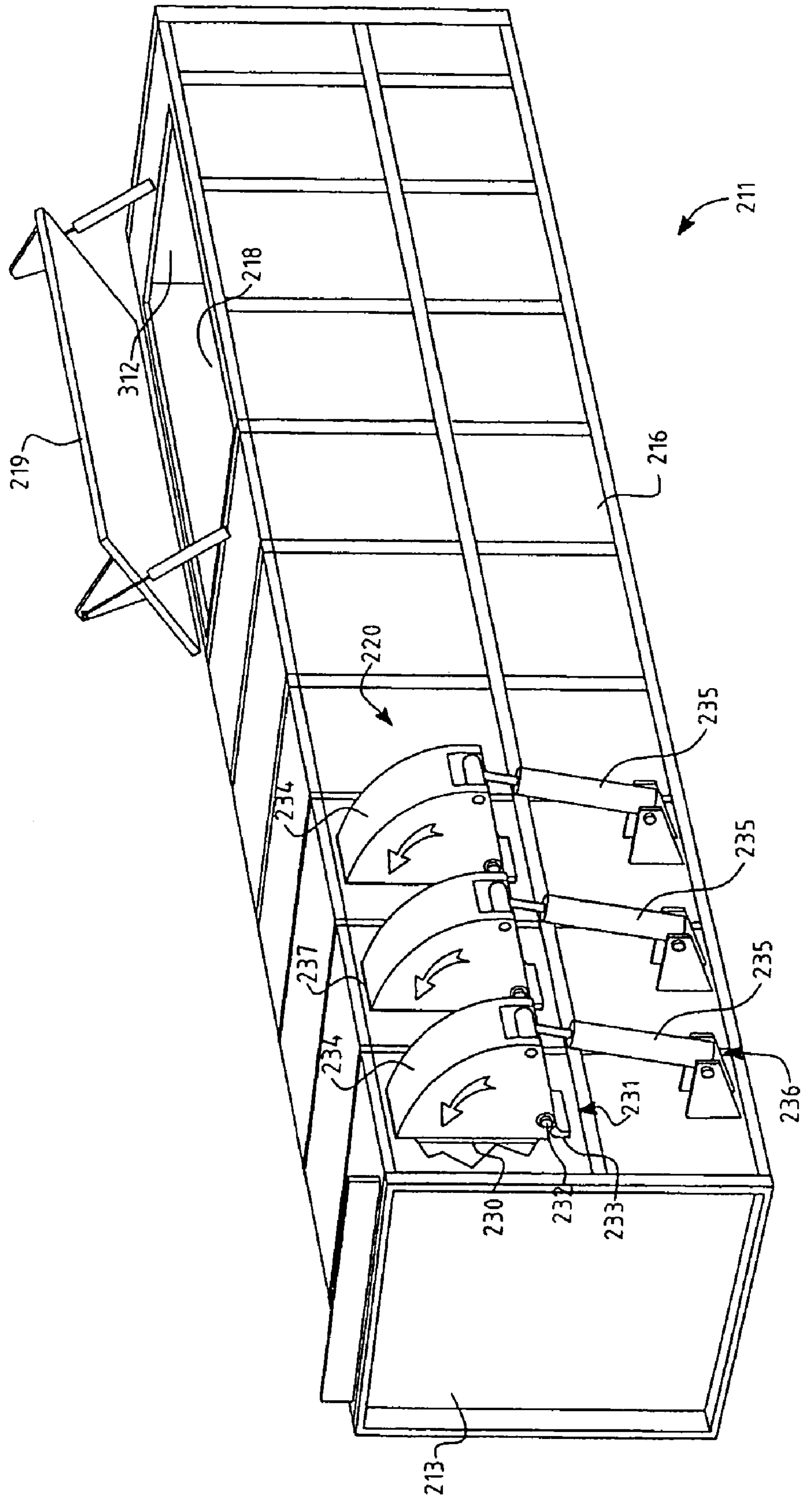
FIG. 11 is a perspective view of a third embodiment of the invention.

With reference to FIG. 11, a refuse compacting container structure 211 is constructed in similar manner to the container structures of the first and second embodiments and incorporates a material urging structure 212 and incremental urging mechanisms, (not shown) as previously described. Likewise it is provided with top opening 218 and top opening cover 219 and a discharge gate 213. As with the first and second embodiments the structure may optionally be provided with an intermediate compaction gate to allow for the compaction of smaller quantities of refuse material.

In a preferred first form of this embodiment, at least one additional compaction device 220 is provided along each of the two side walls 216 of the container structure 211 in the area between the top opening and the discharge end of the container. Where a container structure is provided with an intermediate compaction gate the additional compaction devices may best be placed in the area between the top opening and the intermediate gate, but could also be located between the intermediate gate and the discharge gate or even in both these areas.

Again with reference to FIG. 11, each device 220 is in the form of a generally rectangular shaped compactor plate 230 attached to a support structure 224. Support structure 234 is hinged at end 231 to pivot about a shaft 232 located in bearing housings 233 attached to the side wall members 216. The support structure 234 is adapted to pivotally accept the rod end of an hydraulic ram 235, the passive end 236 of which is pivotally attached to the side wall of the container structure.

Apertures in the side walls are adapted to accept the shape of the compactor plate 230 and attachment structure 234 so that when the hydraulic ram of a compaction device is activated, the compactor plate is rotationally driven through the aperture to impact on any refuse material in that area of the container structure.

Initially, during the loading of refuse into the container structure and subsequently during the passage of the material urging structure towards the forward end, the compactor plates of the compaction devices are maintained flush with the internal walls of the container structure. The devices are best brought into action when a sufficient amount of partly compacted material has been accumulated in the area in which the devices are located.

Attachment structures 234 are preferably shaped so as to shut off the aperture through which the compaction device acts so as to prevent refuse material being pulled back through the aperture 237 as the compactor plate 230 is retracted to its position flush with the internal surface the of side wall.

In a second preferred form of this embodiment the additional compaction devices are mounted from the roof of the container structure and operate through apertures in the roof.

Fourth Embodiment

In a further preferred embodiment of the invention the container structure of the first and second embodiments as described above is provided with other additional compaction urging sub-systems. In this form at least a portion of the floor of the container structure is articulated so as to be driven vertically upward by actuators so as to intrude into the container volume from below. The floor portion may be so articulated as a single section or in a number of sections so as to apply maximum compaction force to relatively small volumes of compactable material.

Similarly, a portion of the roof of the container structure, singly or in sections, may be articulated to provide compaction force from above. These compacting forces acting from below and from above may then be applied together or in an alternating sequence to the compactable material to provide the maximum disturbance so as to minimise voids. A sequence may include periods where both the upper and lower compacting surfaces advance followed by rapid reversals of direction so as to agitate the material.

In a further aid to agitation the floor of the container structure may be provided with oscillating or reciprocating plate sections set into shallow scalloped recesses so as not to impede the advance of the incrementing material urging structure as described in the previous embodiments.

Fifth Embodiment

In a fifth preferred embodiment of the invention, the incremental advancing mechanism of the first or second embodiments described above is adapted to the unloading of a transport vehicle. In this instance the object of the mechanism is not to compact but to remove a substantially unobstructed load, such as for example a compacted refuse load from a transport vehicle.

Figure 12:
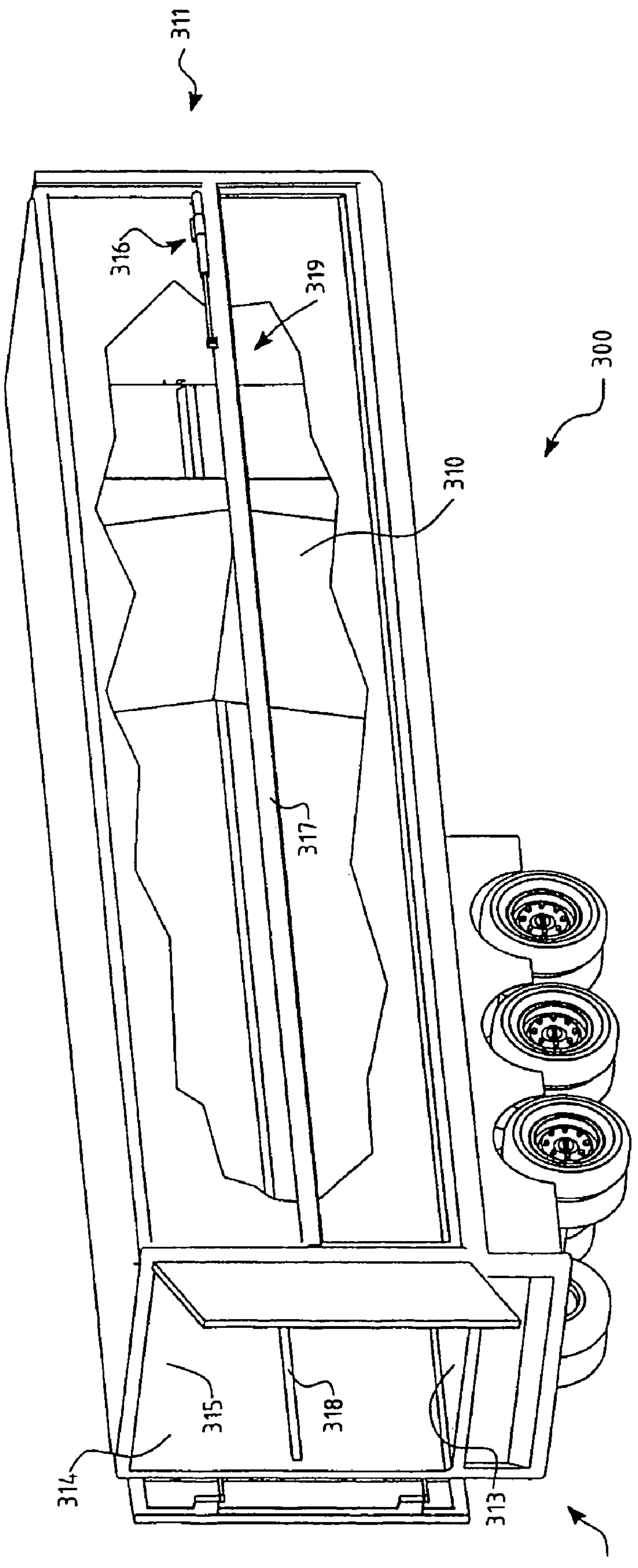
FIG. 12 is a perspective view of a fifth preferred embodiment of the invention.

With reference to FIG. 12, a transport vehicle 300 is shown in which the outer surface of one side and a portion of the internal wall of that side have been removed. Transport vehicle 300 is provided with material urging structure 310 extending between floor 313, ceiling 315 and internal walls 314 and adapted to slide along the floor 313 of the vehicle.

Disposed along each side of the transport vehicle are urging mechanisms 319. Urging mechanisms 319 include rail structures extending along the length of the vehicle, which carry reciprocating beams activated by hydraulic rams 316. Each reciprocating beam is provided with thrust assemblies at intervals along its length; these assemblies being in the form described in the first or second embodiments above. Since no compaction is required the hydraulic rams driving the material urging structure are of significantly smaller diameter, and the components of the incrementing mechanism proportionately lighter in construction than those of the previously described embodiments.

The thrust assemblies are caused to act sequentially on material urging structure 310 which is provided, after the manner of the previously described embodiments, with lugs which project from each of its sides through slots 318 along internal walls 314 of the vehicle.

In use, a transport vehicle fitted with this mechanism is loaded while material urging structure 310 is fully retracted to the front end 311 of the vehicle 300. At a discharge site it remains simply to open the doors at rear end 312 and activate the incremental advancing mechanisms to completely empty the transport vehicle.

Sixth Embodiment

In a sixth embodiment of an incremental material urging system there is provided a rail system, a material urging structure and an incrementing drive mechanism.

Figure 13:
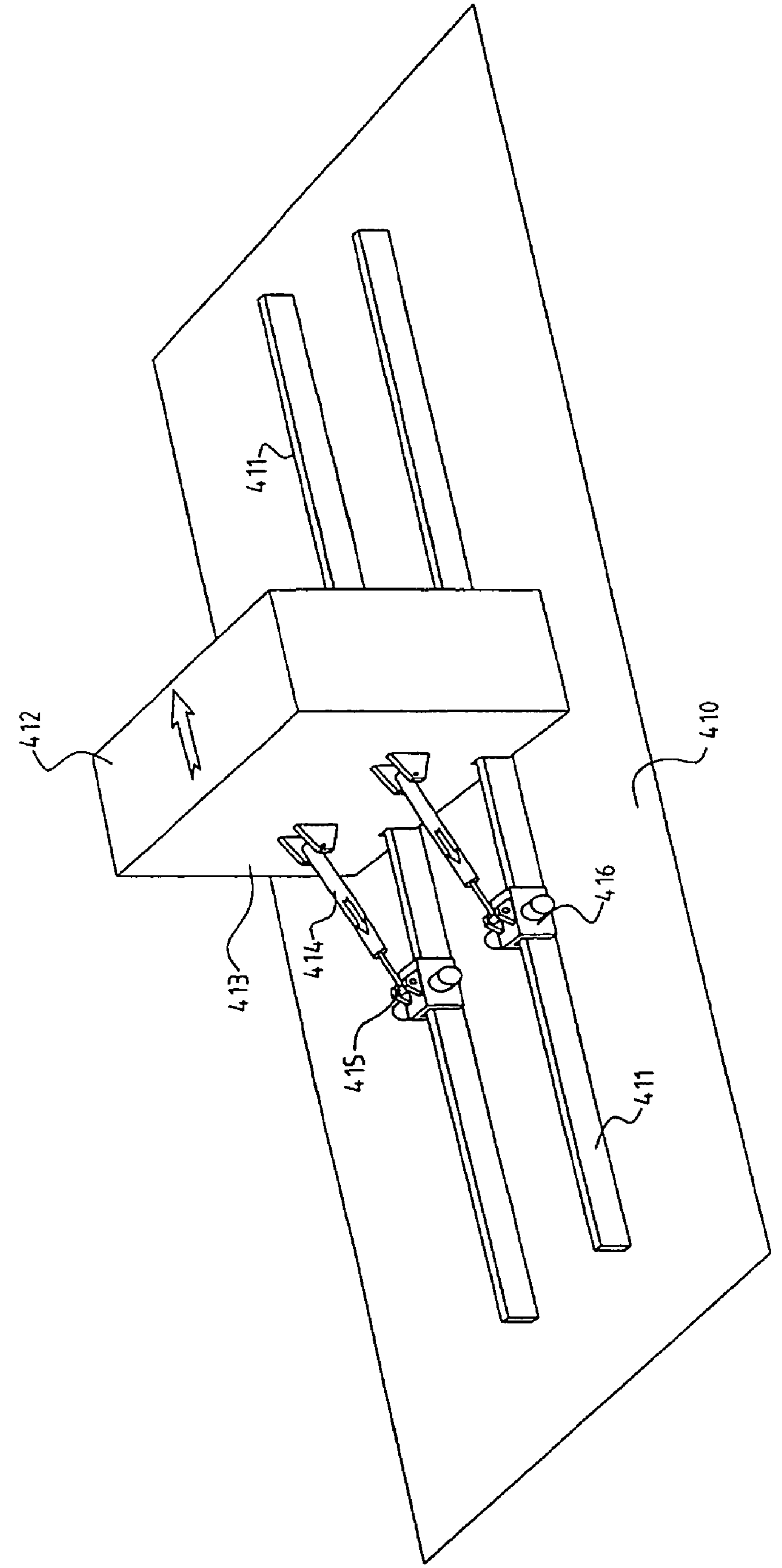
FIG. 13 is a perspective view of a sixth preferred embodiment of the invention.

With reference to FIG. 13, floor 410 is provided with at least a pair of parallel spaced apart fixed rails 411. A material urging structure 412 is adapted to move along rails 411, supported on friction reducing means such as bearing surfaces, internally mounted wheels or linear bearings. Pivotally attached at the rear end 413 of urging structure 412 are extendable linear actuators 414, which may, for example, be pneumatic or hydraulic rams. The active or rod ends 415 of linear actuators 414 are provide with clamping mechanisms 416 adapted to slide along rails 411 when released and, when activated, clamp onto the sides of the rails with suitable calipers.

For the material urging structure 412 to incrementally advance along rails 411, linear actuators 414 are initially retracted as shown in FIG. 13*a*. Clamping mechanisms 416 are then activated to clamp onto rails 411 and the linear actuators extended as in FIG. 13*b* to push the urging structure along the rails. The clamping mechanisms are now released and the actuators retracted, upon which the sequence of clamping, extending the actuators, releasing the clamps and retracting the actuators is repeated to incrementally advance the urging structure along the rails.

Urging structure 412 may be incrementally reversed along the rails by a reverse sequence of the linear actuator extensions and retractions and the clamping mechanisms.

In an alternative preferred form of this embodiment, the rails may be substituted by channels let into a floor structure and in which the clamping mechanisms comprise outwardly acting calipers to act on the internal sides of the channels. In this form of the embodiment the urging structure may be adapted to slide on the floor surface or be provided with friction reducing means such as for example wheels.

In use, the mechanism may be used to advance objects along a platform such as for example a loading dock. Thus, again by way of example, an array of two rows of pallets making up the entire load intended for a flat bed transport vehicle may be transferred from the loading dock in a series of incremental linear movements. For this application a preferred arrangement of the rails is that of two pairs of rails, each pair suitably spaced to provide support and guidance to the rows of pallets.

In further examples of applications of this embodiment, the device may be installed in a transport vehicle for the purpose of ejecting a load from the vehicle, or when fitted to the container structure of a refuse transfer station it may be used to incrementally drive a material urging structure.

In yet a further example of the use of the device, the rails may include curved sections.

The urging structure may be fitted with braking means to maintain it at any incremented position while the linear actuators re-position the clamping mechanisms. When provided with such braking means the urging structure may be adapted to operate along inclined surfaces.

Seventh Embodiment

In a seventh preferred embodiment of the invention an incremental material urging system comprises a set of reciprocating rail structures, a material urging structure and clamping mechanisms.

Figure 14:
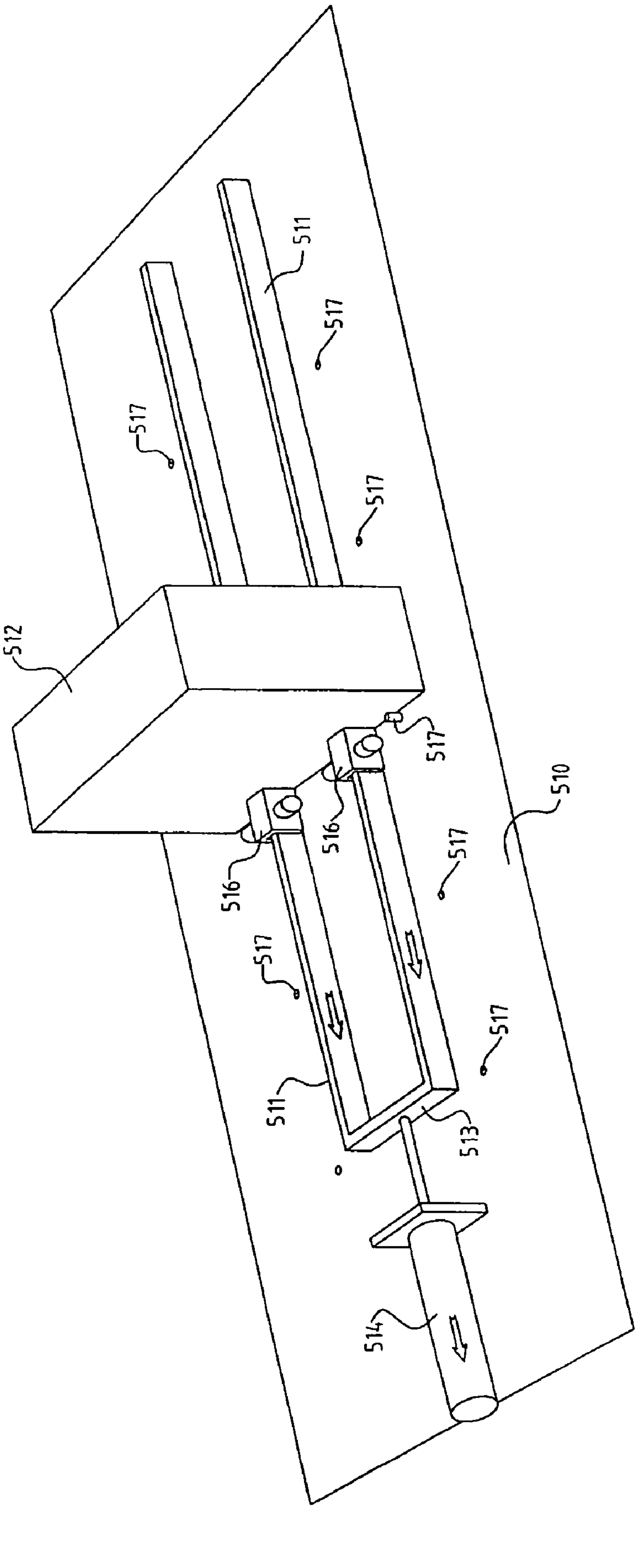
FIG. 14 is a perspective view of a seventh preferred embodiment of the invention.

With reference to FIG. 14, floor structure 510 is provided with at least a pair of parallel spaced apart rails 511 adapted to slide on the floor surface or on a series of suitable linear bearings or wear pads (not shown). Rails are interconnected by yoke 513 at one end and yoke 513 is in turn connected to a linear actuator 514 such as, for example, an hydraulic ram.

Floor structure 510 is further provided with a plurality of arresting pins 517 retracted flush with the floor when not in use but adapted to project a certain distance above floor level when required. Arresting pins 517 are arranged, preferably in pairs transverse to the rails, at intervals along floor 510 corresponding to the stroke length of linear actuator 514.

A material urging structure 512 is adapted to ride on rails 511 and is provided with clamping mechanisms 516 adapted to grip onto the rails. An incremental movement of material urging structure 512 may then be effected by applying clamps 516 and activating linear actuator 514 to urge an incremental movement of rails 511 thereby forcing a corresponding movement of urging structure 512.

Thus for a movement in the direction away from the linear actuator as mounted in FIG. 14, the extension of the linear actuator with the clamping mechanisms locking it to the rails, will drive the urging structure in the desired direction. For a subsequent increment the arresting pins immediately behind the current position of the urging structure are raised to project from the floor, the clamps are released and the linear actuator retracted to draw the rails back into their initial position ready for the next increment.

Clearly the sequence when reversed allows for the movement of the urging structure in the opposite direction also. In a further form of this embodiment the arresting pins acting through the floor may be replaced by a locking system incorporated in the material urging structure itself. One form of such a locking system comprises friction pads driven downwardly from the urging structure against the floor, providing sufficient friction to prevent the urging structure from being moved from its current position through the repositioning of the rails for the next increment. In a further preferred form, the urging structure is lifted clear of contact with the rails while these are retracted for a next increment.

In yet a further alternative form of this embodiment the material urging structure is supported on wheels or other friction reducing means on the floor and not on the articulated rails which instead pass through clearance channels in the structure or below the structure so that when the clamps are released the rails may be relocated with no disturbance to the urging structure.

The device as described may be used as both a means of transferring a load from a loading dock onto a transport vehicle or, when fitted to the floor of a transport vehicle, for the unloading of that vehicle.

Again, when fitted to the container structure of a refuse transfer station the device may be used to drive a material urging structure for the compaction of a refuse load.

Eighth Embodiment

Figure 18:
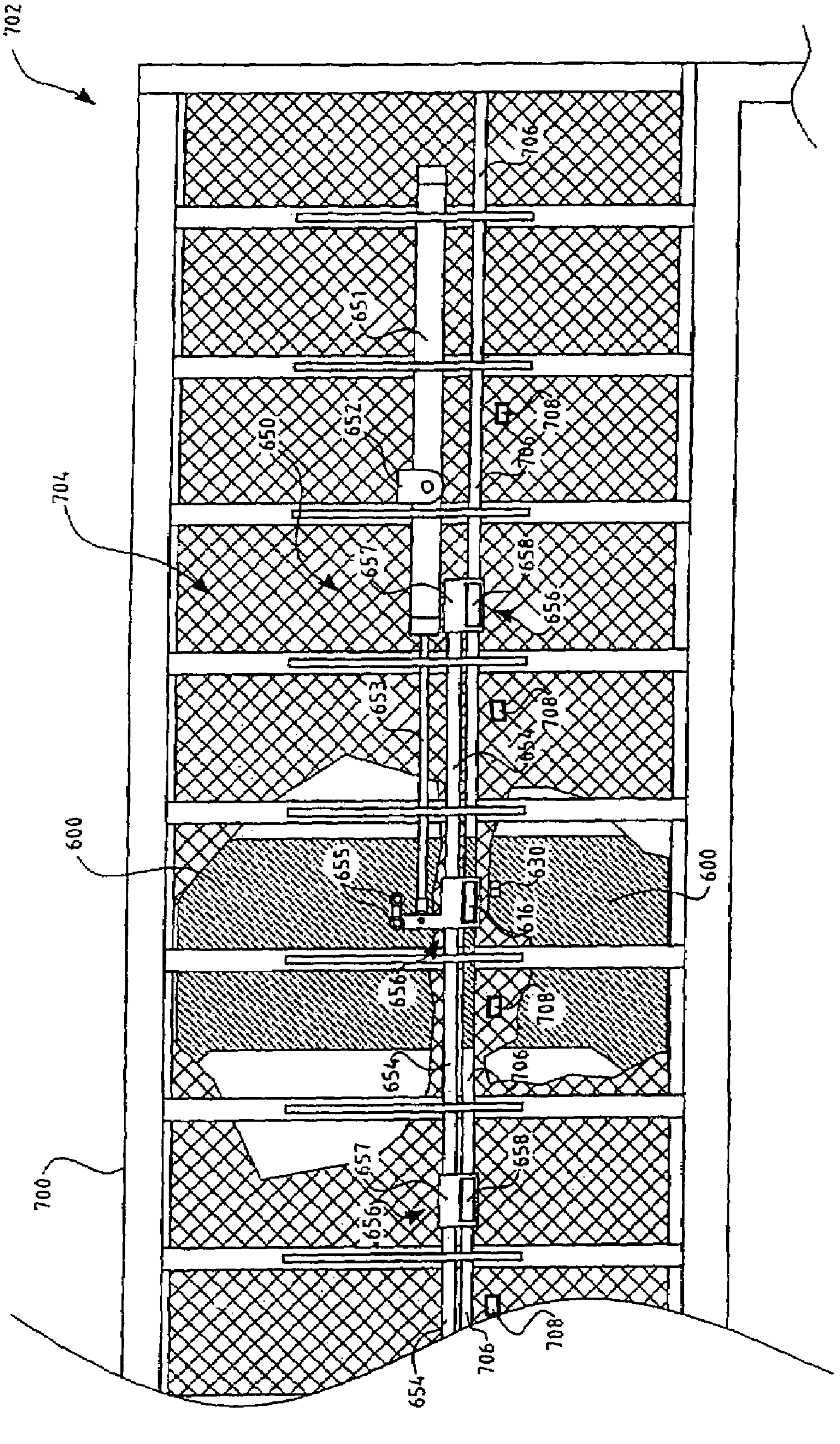
FIG. 18 is an elevation view of part of a container structure with side wall sheeting partially removed to show the material urging structure of FIG. 15.

In yet a further embodiment of an incremental material urging system adapted to the compaction of loose material, a container structure similar to that previously described for the first embodiment herein above and shown in FIG. 1, also comprises a floor substructure, wall substructures, a roof substructure and a discharge gate disposed at a forward end of the container structure. A portion of the rearward end of the present container structure 700 is shown in FIG. 18.

Figure 15:
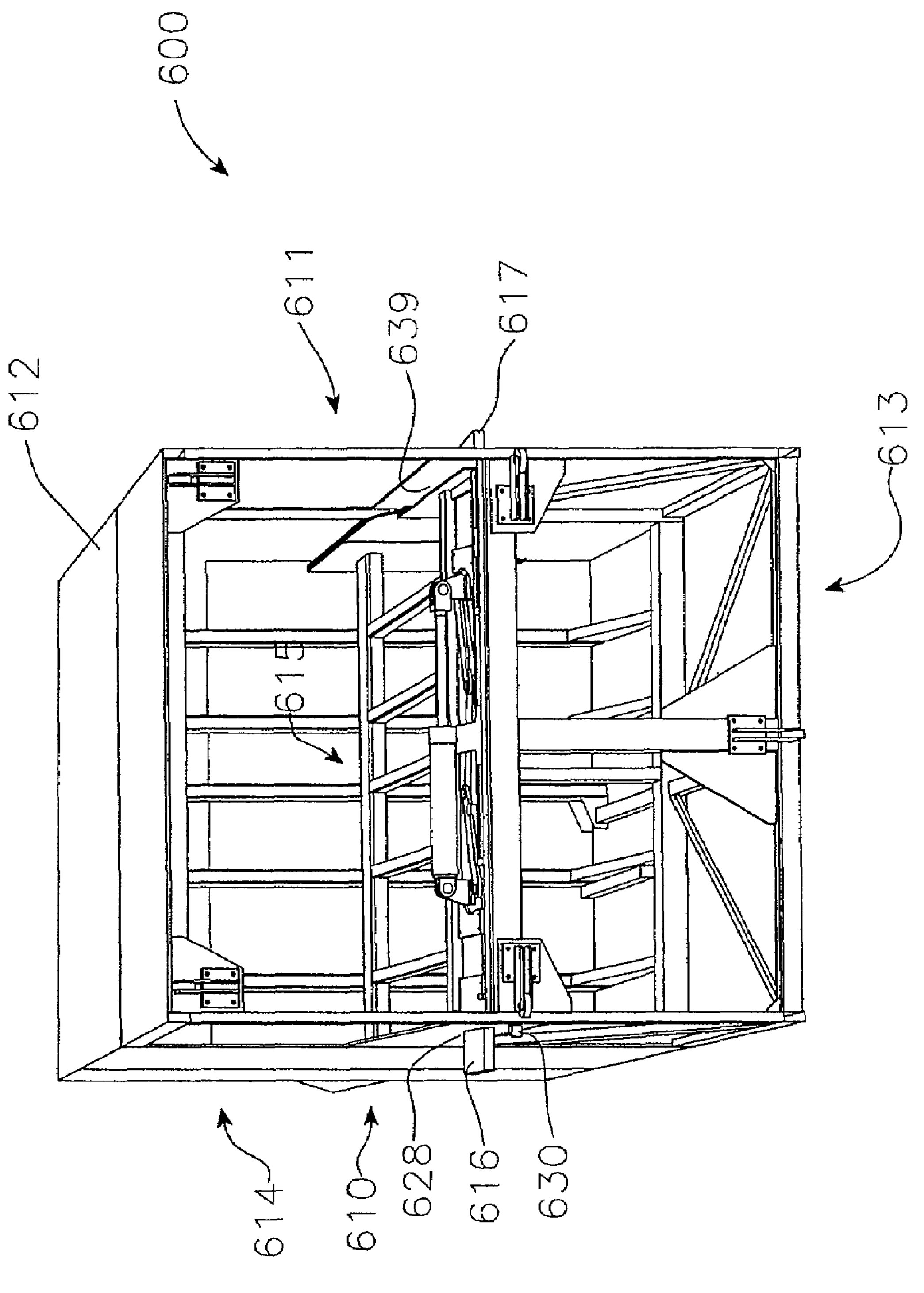
FIG. 15 is a perspective view of a further preferred embodiment of a material urging structure when viewed from the rear.

A material urging structure 600 of the present embodiment shown in FIG. 15 is preferably of substantially box-shaped construction, having sides 610 and 611, top 612, bottom 613 and front compacting face 614. Material urging structure 600 is adapted to substantially traverse the length of the container structure and is dimensioned so as to leave minimal clearance between urging structure 600 and the internal surfaces of the floor, walls and roof substructures of container structure 700. Prior to a compaction phase of the material urging system the material urging structure 600 is retracted towards a rearward end 702 (that is the end opposite to the discharge gate) of the container structure 700, at least to an extent that loading of material to be compacted may be introduced into the container structure. This may be accomplished for example through a top opening provided with a top opening cover or through side apertures as previously described.

The material urging structure 600 is urged into incremental movement in both an advancing and compacting forward direction, that is towards the discharge gate, and a retracting direction, through the interaction of two hydraulically driven mechanical systems; a driving system and an engagement system.

Figure 16:
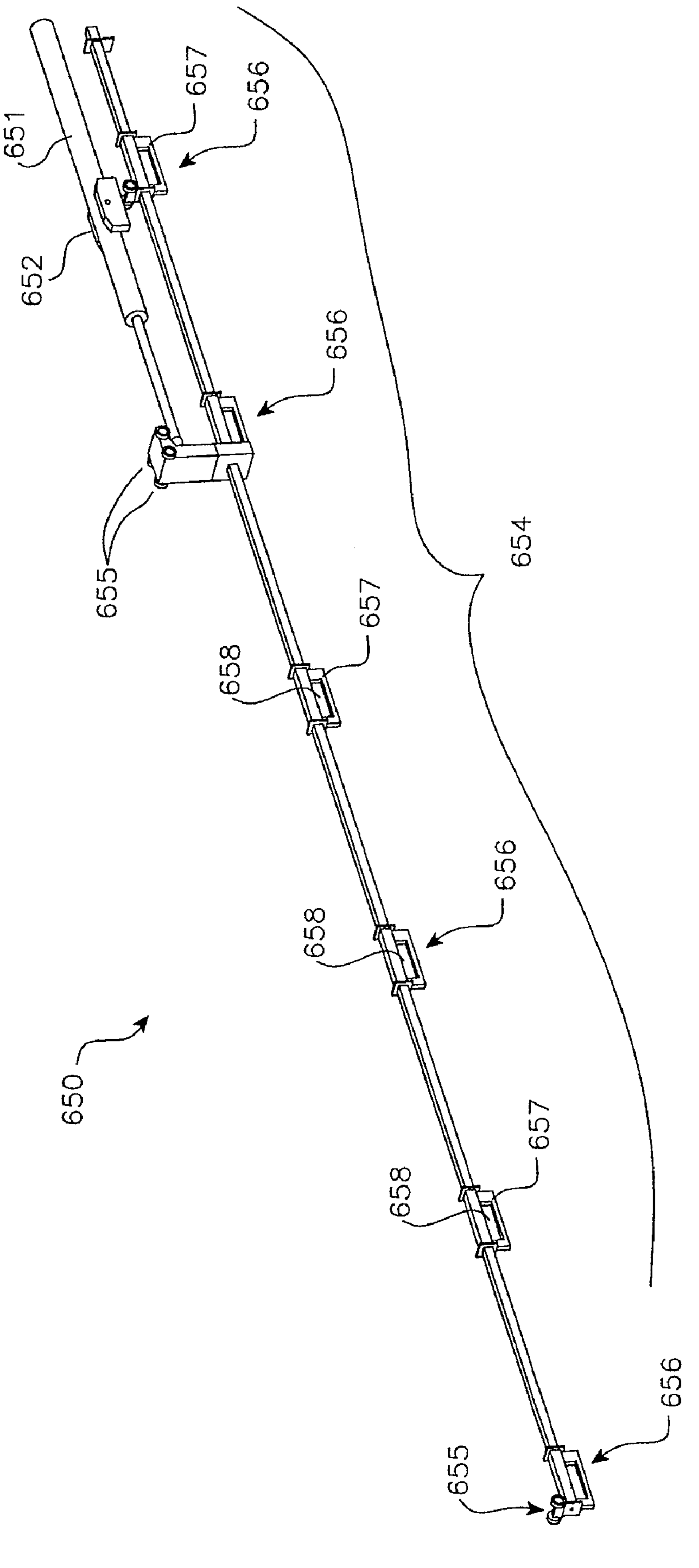
FIG. 16 is a perspective view of one of a pair of primary mechanical systems for the embodiment of FIG. 15.

The first of these, the driving system, includes two identical mechanisms disposed one on each side of the container structure 700. With reference to FIG. 16 in which one of these mechanisms 650 is illustrated, each includes an hydraulic ram 651 affixed by mounting bracket 652 to the outside of the side wall substructure 704 at the rearward end 702 of the container structure as best seen in FIG. 18. Both rams and mechanisms 650 on each side of the container structure are arranged to stroke in unison. The piston rod 653 of each ram 651 drives an engagement nest beam 654 extending substantially the length of the container structure 700 and guided, for example by roller elements 655, so as to allow the beam 654 to be driven into horizontal reciprocating motion by its respective ram 651.

Engagement nest beam 654 is provided with a number of engagement nests 656 rigidly connected to the beam 654 and equi-spaced along the length of the beam; the spacing conforming to the stroke of the ram 651. Each nest 655 may take the form of a plate 657 in which is provided an elongate slot 658. These elongate slots 658 then lie along a common horizontal line at a level coincident with the continuous slot 706 in each side wall substructure 704 which extends substantially along the length the container structure as previously described in the first preferred embodiment above.

The second mechanical system, that is the engagement system mechanism 615, is shown in FIG. 15 and is incorporated within the material urging structure 600. With reference to the enlarged view of the mechanism 615 in FIG. 17, a first thrust tongue plate 616 and second thrust tongue plate 617 are slidably supported between horizontal guide rails 618 and 619 and between upper and lower guide plates 620 and 621. Each thrust tongue plate 616 and 617 is pivotally connected to a linkage arm 622 and 623 respectively which in turn are pivotally connected to a central pivot arm 624. Central pivot arm 624 is arranged to rotate about fixed vertical pivot axis 625 mounted between support plates 626.

Mounted to and between the inner ends of first thrust tongue plate 616 and second thrust tongue plate 617 is a thrust tongue hydraulic ram 627. It will be clear that by means of the mechanism of linkage arms 622 and 623 and central pivot arm 624, first thrust tongue plate 616 and second thrust tongue plate 617 will retract inwardly when thrust tongue hydraulic ram 627 in-strokes and extend outwardly to the position shown in FIG. 17 when the thrust tongue hydraulic ram 627 out-strokes.

Referring again to FIG. 15, it can be seen that the mechanism 615 is so located within material urging structure 600 that when the thrust tongue hydraulic ram 627 is in its out-stroked position, first and second thrust tongues 616 and 617 project through slots 628 and 629 in the sides of material urging structure 600. These slots are positioned to coincide with the continuous slot 706 in each side wall substructures 704 of the container structure 700 when urging structure 600 is installed.

Figure 17:
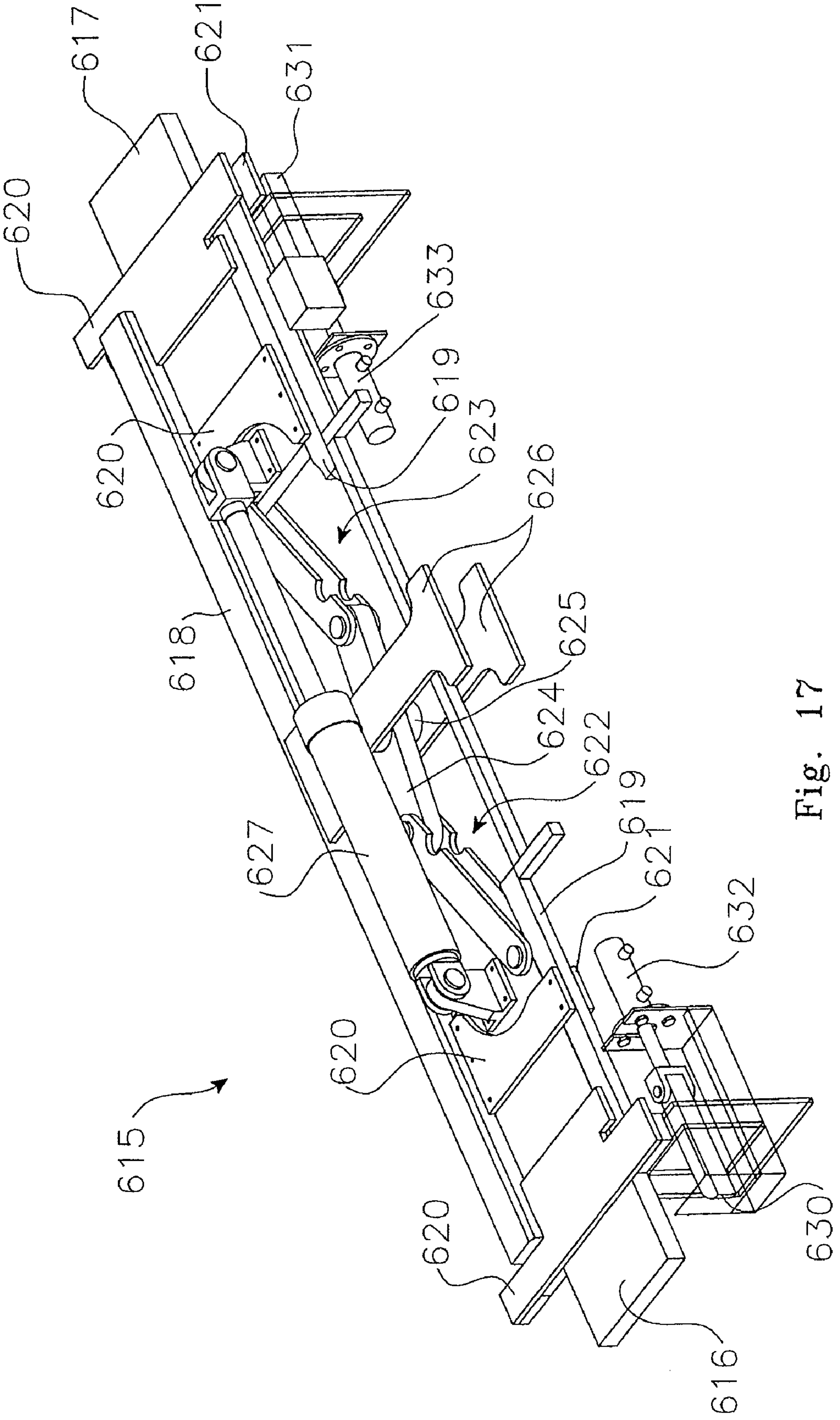
FIG. 17 is an enlarged perspective view of a secondary mechanical system for the embodiment of FIG. 15.

Second mechanism 615 is further provided with first and second retainer tongue plates 630 and 631, each of which is urged into reciprocal motion by hydraulic rams 632 and 633 respectively. When hydraulic rams 632 and 633 are in out-stroked position (as shown in FIG. 17) first and second retainer tongue plates 630 and 631 project through slots in the sides of material urging structure 600 as can be seen in FIG. 15 (second retainer tongue 631 is hidden from view).

Each side wall substructure 704 of the container structure 700 is provided with a series of retainer slots 708 as shown in FIG. 18 arranged below the continuous slot 706 in the side walls of the container structure and adapted to coincide with the positions of first and second retainer tongue plates 630 and 631 when material urging structure 600 is at each of incremented positions along the length of the container structure. Thus the interval between successive retainer slots is equal to the spacing of engagement nests 655 and the stroke of the rams 651. In FIG. 18 urging structure 600 is shown at an intermediate position between two incremented locations.

The slots 706 are sized to accept the insertion of retainer tongue plates 630 and 631 as a sliding fit so as to lock material urging structure 600 into a currently incremented position.

To effect a forwardly incrementing movement of the material urging structure 600, rams 651 are initially in an in-stroked condition. First and second thrust tongues 616 and 617 are then urged into an outwardly extended position by the out-stroking of thrust tongue hydraulic ram 627 so as to project through the continuous slots in the side walls of the container structure and engage with coinciding slots 658 of engagement nests 656 of each of the driving system engagement nest beams 654.

As first and second thrust tongues 616 and 617 engage with aligned nest slots 658, first and second retainer tongues 630 and 631 are retracted from engagement with their respective coinciding retainer slots 708. The driving system rams 651 then out-stroke to drive material urging structure 600 into a next advanced position where retainer tongues 630 and 631 are urged outwardly to engage with the corresponding retainer slots 708 in the side walls. This prevents any partial retraction of the material urging structure 600 which may be induced by the reaction force of compressed material between material urging structure and the discharge gate.

The first and second thrust tongues 616 and 617 are now retracted from their engaged position with the slots 658 of nests 656 of the engagement nest beams 654 thus allowing the rams 651 of the driving mechanical system 650 to retract. This brings the next forward nests 656 of the engagement nest beams 654 into coincidence with the thrust tongue positions of the material urging structure to allow for a further incrementing cycle.

The discharge gate may be opened when the material urging structure 600 has reached a position relative to the engagement nests 656 where the compression of the material between the discharge gate and the material urging structure has reached a desired degree. This will generally occur well before the most forwardly incremented position available. Preferably sufficient material is loaded into the container structure, and that point of desired compression achieved, when the volume of the compressed material is approximately equal to that of a transport vehicle brought into alignment with the container structure at the discharge end.

Further forward increments of the material urging structure may then be used to drive the compressed volume of material into the transport vehicle through the opened discharge gate. In at least one preferred form of the present embodiment the last forward stroke of the primary system and the configuration of the material urging structure are such that the material urging structure projects sufficiently through the discharge gate to fully drive a load of compacted material into an abutting transport vehicle.

At the final forward increment the first and second thrust tongue plates 616 and 617 remain engaged with their respective nests and the subsequent in-strokes of the primary system rams 651 then constitute the first retraction of the material urging structure 600. Further retraction cycles may be effected by sequences of retraction of first and second thrust tongue plates, out-stroking of the primary system rams and re-engagement of the first and second thrust tongue plates with the next coincident nests of the engagement nest beams. Since there is no reaction force of compressed material acting on the material urging structure, the use of the first and second retainer tongues during retraction is not required.

Ninth Embodiment

Figure 19:
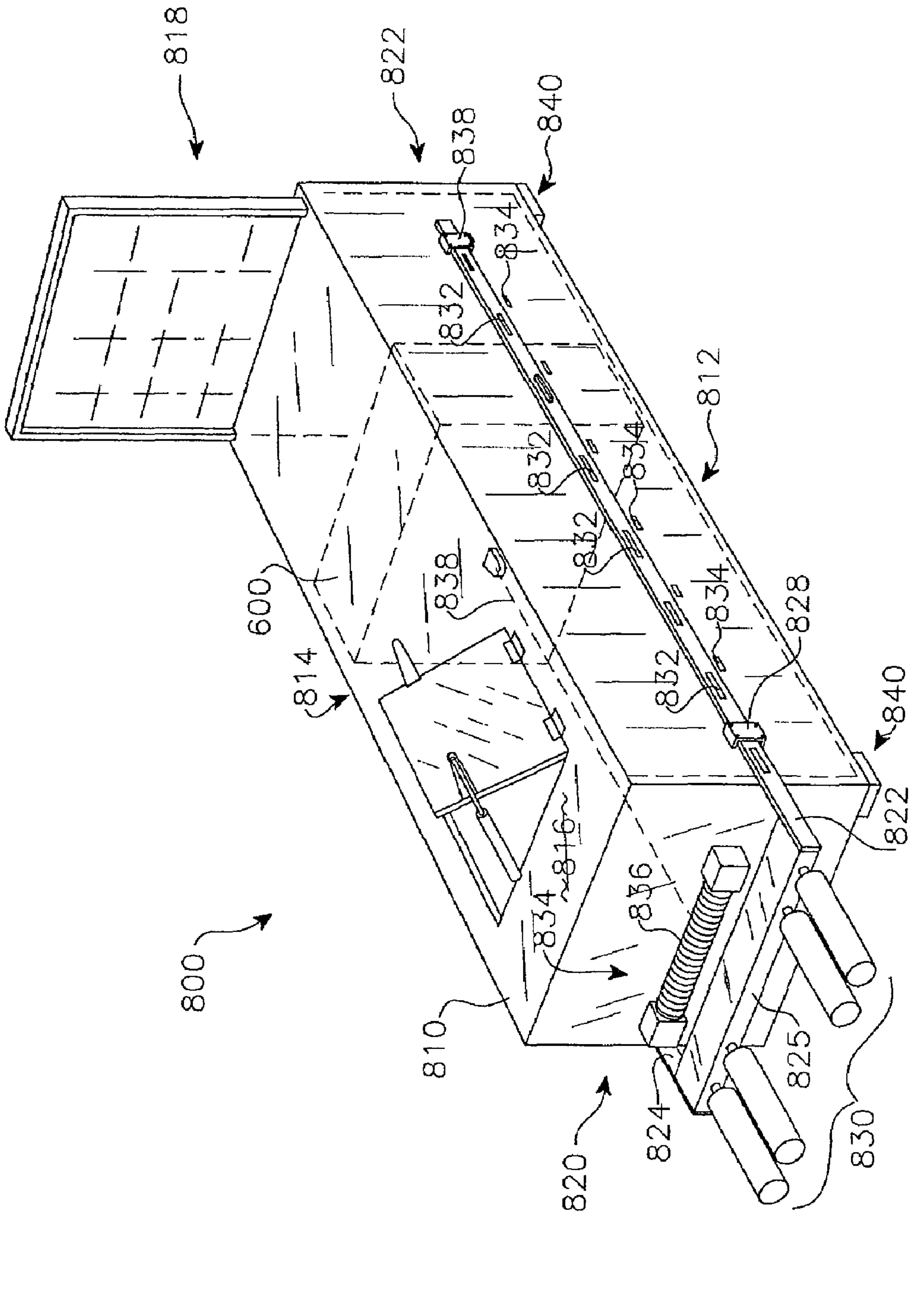
FIG. 19 is a perspective view of a further preferred embodiment of a material urging system according to the invention.

In a further preferred embodiment of the invention, with reference to FIG. 19, an incremental material urging system 800 comprises a container structure 810 as previously described comprising a floor substructure 812, wall substructures 814, a roof substructure 816 and a discharge gate 818 disposed at a forward end of the container structure. As described for the Eighth Embodiment above, a material urging structure 600 (as shown in detail in FIG. 15) is adapted for reciprocal movement within container structure 810 between rearward end 820 and forward end 822.

In this embodiment nest beams 822 and 824, perform the same function as the nest beams 654 shown in FIGS. 16 and 18 of the Eighth Embodiment above. However, in this preferred embodiment nest beams 822 and 824 are linked together at their rearward ends by a cross member 826 as shown in FIG. 19, to form a rigid fork-like structure. Each nest beam 822 and 824 of the fork-like structure is slidingly supported along the sides 814 of container structure 810 by roller elements 828, so as to ensure that both beams are driven uniformly into horizontal reciprocating motion. In this embodiment, an array of hydraulic cylinders 830 rigidly supported by a frame (not shown) attached at the rearward end 820 of container structure 810 acts on cross member 826.

Again, as for the Eighth Embodiment described above, material urging structure 600 is provided with the same hydraulically operated mechanism shown detailed in FIG. 16, which alternately connects the structure 600 with corresponding opposite nests or slots 832 of nest beams 822 and 824 during a forward increment, and with the corresponding opposite side retainer slots 834 as the beams retract in preparation for the next following forward stroke. In this embodiment, the hydraulic oil reservoir, pump and drive motor, which may be electrical or diesel driven, (not shown) are wholly contained within the urging structure 600.

The incremental forward urging of the urging structure 600 by the nest beams 822 and 824 of the fork-like structure is identical to the process described above for the Eighth Embodiment. However, in this embodiment, the urging structure 600 is not returned to the rearward end 820 of the container structure 810 by a reversal of the incremental urging of the nest beams 822 and 822, but by a separate return mechanism 834 shown in FIG. 19.

Return mechanism 824 comprises a winch 836 mounted to the rearward end 820 of container structure 810, with a cable or chain 838 attached to the rearward end of the incremental urging structure 600. Preferably, the return mechanism is provided with a rotary encoder or other monitoring equipment so that the length of cable or chain extending between the winch 836 and the urging structure 600 is known for any location of the urging structure within the container structure 810. By this arrangement, urging structure 600 may be rapidly retracted, either fully from its furthest advanced position at discharge gate 818, or from any advanced intermediate position to a rearward position if required.

Figure 20:
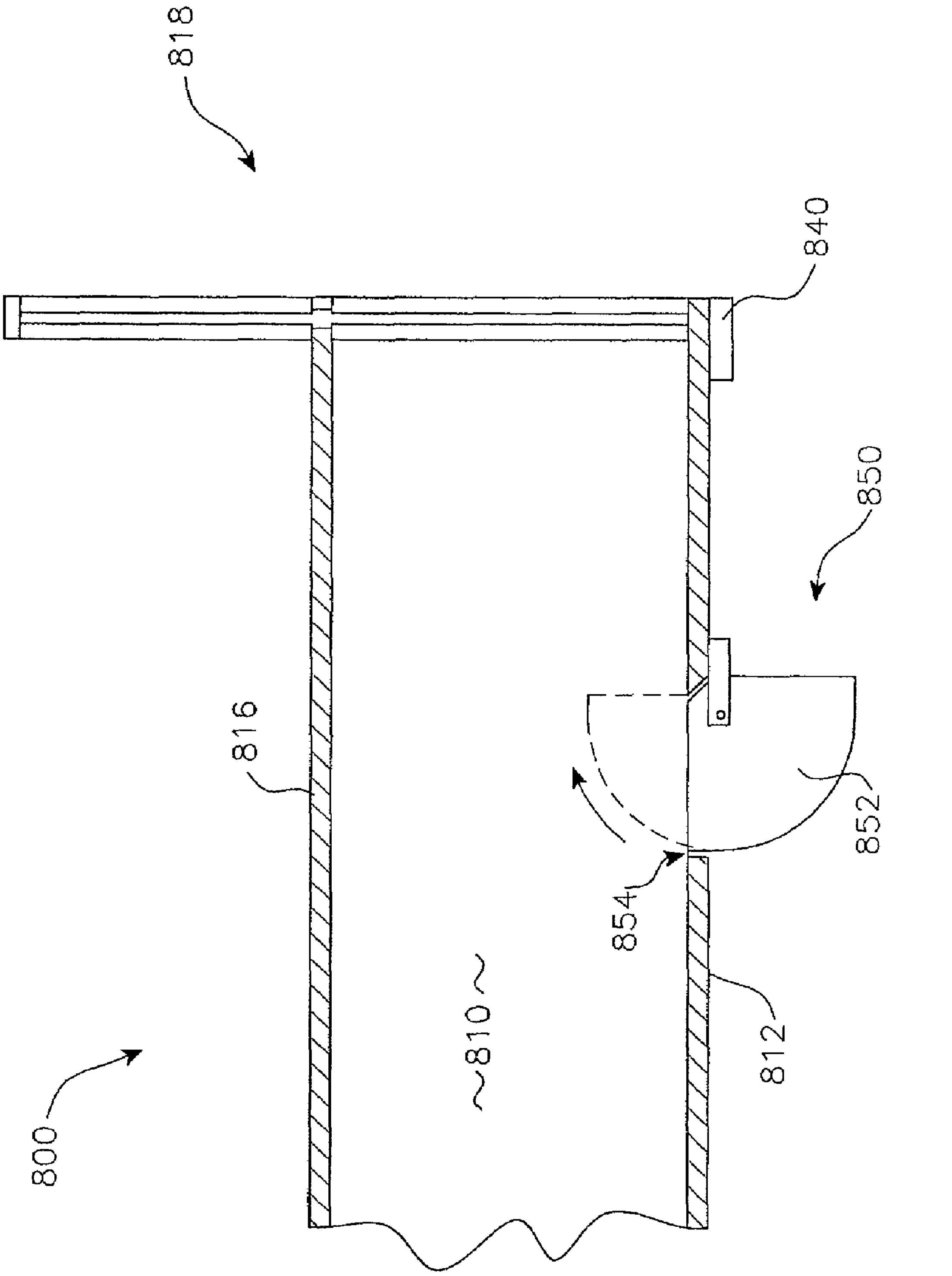
FIG. 20 is a sectioned side view of a forward end portion of the urging system of FIG. 19 showing an additional compaction device.

With reference now to FIG. 20, the container structure 810 of this embodiment is provided with at least a pair additional compaction devices 850 mounted below the floor 812 of the container structure 810. These devices 850 are similar to those described for the Third Embodiment above, but in this embodiment act through slots in the floor 812 (rather than the sides) of the container structure. The devices comprise steel quadrants 852 hingedly attached at their centers to the floor and hydraulically driven by rams (not shown) to rotate upwardly through slots 854 in the floor 812.

The function of these additional compaction devices 850 is to crush heavy rigid articles which may become jammed between the face of the urging structure and the discharge gate 818, and which are of sufficient strength to impede any further forward movement of the urging structure. Preferably, the steel quadrants 852 are some sixty millimeters in thickness so that the force supplied by their driving rams is concentrated on an obstructing article in a narrow band.

Again with reference to FIG. 19, container structure 810 in this embodiment is further provided with four load cells 840 incorporated in the support structures (not shown) at the four corners of the container structure 810. The four load cells 840 are in communication with a computer (not shown) which is adapted to interpolate output signals from the load cells and calculate the refuse load distribution within the container structure 810.

By means of the load cell data and by monitoring the position of the urging means, a refuse load can be prepared which is optimal in both length and weight for the transport vehicle into which it is to be loaded.

The above describes only some embodiments of the present invention and modifications, obvious to those skilled in the art, can be made thereto without departing from the scope and spirit of the present invention.

The invention claimed is:

1. A waste compaction system adapted to the compaction of a volume of compactable material; the system comprising:
- (a) a container structure including floor, roof, and opposing side wall structures, arranged such that the container structure is closed at a rearward end,
- (b) a loading aperture in the roof for introducing the compactable material into the container structure,
- (c) an incrementing urging structure adapted to traversing substantially the length of the container structure from a fully retracted position at the rearward end of the container structure, to a fully advanced position at a discharge end of the container structure,
- (d) a discharge gate at the discharge end of the container structure for the ejection of the compactable material, characterized in that the incrementing urging structure is urged into incremental horizontal motion within the container structure by a first and a second cooperating mechanical systems, wherein the first mechanical system includes a pair of reciprocating beams extending substantially along an outside of each opposing side wall structure such that the beams engage at each of a plurality of incrementing cycles with engaging elements of the incrementing urging structure, where each incrementing cycle of the first mechanical system directed towards the discharge end of the container structure induces the incrementing urging structure to advance a predetermined distance towards the fully advanced position at the discharge end.

2. The system of claim 1 wherein the first cooperating mechanical systems is an urging structure driving mechanism.

3. The system of claim 2 wherein the second cooperating mechanical systems is an incrementing urging structure engagement mechanism disposed within said incrementing urging structure.

4. The system of claim 3 wherein the incrementing urging structure is comprised of a structure having at least a material urging front compacting face substantially equal in area and dimensions as an internal cross section of the container structure; the urging structure further including side elements and top and bottom elements adapted to permit sliding movement of the urging structure within the container structure.

5. The system of claim 4 wherein each of said side wall structures is provided with an elongate slot extending substantially the length of said container structure; said slot communicating with the inside surface of each of said side wall structures.

6. The system of claim 5 wherein said incrementing urging structure engagement mechanism includes a pair of thrust tongue plates each disposed at one of said side elements of said urging structure and urged by actuator means so as to alternate between a first inwardly retracted state and a second outwardly projecting state; the arrangement being such as to cause each of said thrust tongue plates to project outwardly through a respective said elongate slot.

7. The system of claim 6 wherein said engagement mechanism further includes a pair of retainer tongue plates; each of said retainer tongue plates disposed at respective said side elements of said incrementing urging structure and urged by actuator means to alternate between a first inwardly retracted state and a second outwardly projecting state; the arrangement being such as to cause each of said retainer tongue plates to engage with respective ones of a pair of opposing retainer slots; said pair being one pair of a plurality of pairs of retainer slots arranged along said sidewall structures of said container structure.

8. The system of claim 7 wherein the pair of reciprocating beams is urged into reciprocal horizontal motion by incrementing urging structure driving mechanism hydraulic rams.

9. The system of claim 8 further comprising two elongate members that are linked rigidly together at rearmost ends of said elongate members by a cross member.

10. The system of claim 9 wherein each reciprocating beam is provided with a plurality of equi-spaced engagement nests; where each nest includes an elongate slot horizontally aligned with the elongate slot in the sidewall structure.

11. The system of claim 10 wherein successive opposing pairs of said elongate slots of said engagement nests are adapted to receive inserted therein a respective said thrust tongue plate when said thrust tongue plates are urged into said outwardly projecting state.

12. The system of claim 11 wherein spacing between the engagement nests is substantially equal to the stroke of the hydraulic rams of the incrementing urging structure driving mechanism.

13. The system of claim 12 wherein spacing between said plurality of retainer slots is equal to said spacing between said engagement nests.

14. The system of claim 13 wherein said system is further provided with a retracting mechanism; said retracting mechanism adapted to retract said incrementing urging structure from an advanced position within said container structure to a rearward position.

15. The system of claim 14 wherein the retracting mechanism comprises:

a winch located at the rearward end of the container structure;

a cable or chain from the winch attached to the urging structure; and sensing means adapted to monitor position of the incrementing urging structure within the container structure.

16. The system of claim 15 further comprising a plurality of corner supports arranged at an underside of the container structure and wherein the container structure is further provided with load cells disposed at each corner support of the container structure; and wherein signal outputs of each of the load cells are processed by a computer linked to the load cells; the computer adapted to monitor weight and weight distribution of a volume of compacted refuse in the container structure.

17. The material urging system of claim 1, wherein each increment of the incrementing urging structure from the fully retracted position towards the fully advanced position moves material towards the discharge end.

18. A method for forward incremental urging of an incremental material urging system adapted to the compaction of a volume of compactable material; said system comprising:

a container structure including floor, roof, and opposed side wall structures closed at a rearward end wherein each of said side wall structures is provided with an elongate slot extending substantially the length of said container structure; said slot communicating with the inside surface of each of said side wall structures, a loading aperture in said roof for introducing said compactable material into said container structure, an incrementing urging structure adapted to traversing substantially the length of said container structure and comprising a structure having at least a material urging front compacting face substantially equal in area and dimensions as an internal cross section of said container structure; said urging structure further including side elements and top and bottom elements adapted to permit sliding movement of said urging structure within said container structure, a discharge gate at a discharge end of said container structure for the ejection of said compactable material, an urging structure driving mechanism comprising a pair of elongate members disposed along respective outsides of said sidewall structures; said elongate members urged into reciprocal horizontal motion by incrementing urging structure driving mechanism hydraulic rams wherein said pair of elongate members are linked rigidly together at rearmost ends of said elongate members by a cross member and wherein each said elongate member is provided with a plurality of equi-spaced engagement nests; each said nest including an elongate slot; each said elongate slot of each of said engagement nests horizontally aligned with said elongate slot in said sidewall structure, and an incrementing urging structure engagement mechanism disposed within said incrementing urging structure and comprising a pair of thrust tongue plates each disposed at one of said side elements of said urging structure and urged by actuator means so as to alternate between a first inwardly retracted state and a second outwardly projecting state; the arrangement being such as to cause each of said thrust tongue plates to project outwardly through a respective said elongate slot and further comprising a pair of retainer tongue plates; each of said retainer tongue plates disposed at respective said side elements of said incrementing urging structure and urged by actuator means to alternate between a first inwardly retracted state and a second outwardly projecting state; the arrangement being such as to cause each of said retainer tongue plates to engage with respective ones of a pair of opposing retainer slots; said pair being one pair of a plurality of pairs of retainer slots arranged along said sidewall structures of said container structure and adapted to cooperate with the urging structure driving mechanism such that the incrementing urging structure is urged into incremental horizontal motion within said container structure along the length of said container structure; said method including the steps of:

(a) in-stroking said incrementing hydraulic means of said driving mechanism, (b) urging said thrust tongue plates into said second outwardly projecting state so as to engage with one of said plurality of engagement nests, (c) out-stroking said incrementing hydraulic means so as to urge said elongate member, said plurality of engagement nests and said urging structure one increment towards said forward end of said container structure, (d) urging said retainer tongue plates into said second outwardly projecting state so as to engage with respective ones of said plurality of said retainer slots along each of said sidewall structures, (e) urging said thrust tongue plates into said first inwardly retracted state, (f) in-stroking said incrementing hydraulic means, (g) iterating steps (a) to (f) until said urging structure reaches a maximum forwardly incremented position.

* * * * *

UNITED STATES PATENT AND TRADEMARK OFFICE

CERTIFICATE OF CORRECTION

PATENT NO. : 7,488,148 B2
APPLICATION NO. : 11/418936
DATED : February 10, 2009
INVENTOR(S) : Laurence Michael Byrne It is certified that error appears in the above-identified patent and that said Letters Patent is hereby corrected as shown below:

Column 4

Line 14, delete "structure" and insert --structure,--

Column 26

Line 34, delete "systems" and insert --system--

Line 37, delete "systems" and insert --system--

Signed and Sealed this

Eleventh Day of August, 2009

David J. Kappos

David J. Kappos
*Director of the United States Patent and Trademark Office*